(12) United States Patent
Kasai

(10) Patent No.: US 10,104,142 B2
(45) Date of Patent: Oct. 16, 2018

(54) DATA PROCESSING DEVICE, DATA PROCESSING METHOD, PROGRAM, RECORDING MEDIUM, AND DATA PROCESSING SYSTEM

(71) Applicant: THE UNIVERSITY OF ELECTRO-COMMUNICATIONS, Chofu-shi, Tokyo (JP)

(72) Inventor: Hiroyuki Kasai, Chofu (JP)

(73) Assignee: THE UNIVERSITY OF ELECTRO-COMMUNICATIONS, Tokyo (JP)

(*) Notice: Subject to any disclaimer, the term of this patent is extended or adjusted under 35 U.S.C. 154(b) by 278 days.

(21) Appl. No.: 14/909,812

(22) PCT Filed: Aug. 5, 2014

(86) PCT No.: PCT/JP2014/070655
§ 371 (c)(1),
(2) Date: Apr. 19, 2016

(87) PCT Pub. No.: WO2015/020069
PCT Pub. Date: Feb. 12, 2015

(65) Prior Publication Data
US 2016/0308926 A1     Oct. 20, 2016

(30) Foreign Application Priority Data

Aug. 8, 2013 (JP) ................................ 2013-165066

(51) Int. Cl.
*H04L 29/06* (2006.01)
*H04N 21/2365* (2011.01)
(Continued)

(52) U.S. Cl.
CPC .............. *H04L 65/60* (2013.01); *G11B 27/32* (2013.01); *H04N 21/2365* (2013.01); *H04N 21/8456* (2013.01); *H04N 21/85406* (2013.01)

(58) Field of Classification Search
CPC ..................................................... H04L 65/60
See application file for complete search history.

(56) References Cited

U.S. PATENT DOCUMENTS

2003/0103073 A1    6/2003  Yokoyama
2009/0066783 A1*   3/2009  Lee .................... H04N 13/0048
                                             348/43
(Continued)

FOREIGN PATENT DOCUMENTS

EP    2150059 A1       2/2010
EP    2773113 A1 *    9/2014     ........... H04N 19/105
(Continued)

OTHER PUBLICATIONS

Nov. 11, 2014 Search Report issued in International Patent Application No. PCT/JP2014/070655.
(Continued)

*Primary Examiner* — Suraj M Joshi
(74) *Attorney, Agent, or Firm* — Oliff PLC

(57) ABSTRACT

A data processing device, data processing method, program, recording medium, and data processing system have a data size calculation unit that calculates the data size of a joined frame generated if an assumption is made that a first frame inside a first video stream and a second frame inside a second video stream are joined; a header creation unit that creates a header for a multiplexed stream including a joined video stream, using the data size information for the joined frame; a joined video stream generation unit that generates the joined video stream; and a multiplexed stream output unit that performs header output processing for the multi-
(Continued)

plexed stream or outputs the multiplexed stream including the joined video stream.

12 Claims, 14 Drawing Sheets

(51) Int. Cl.
    *H04N 21/854*     (2011.01)
    *G11B 27/32*     (2006.01)
    *H04N 21/845*     (2011.01)

(56) References Cited

U.S. PATENT DOCUMENTS

| | | |
|---|---|---|
| 2010/0169390 A1 | 7/2010 | Park et al. |
| 2011/0164689 A1* | 7/2011 | De Neve .......... H04N 21/23106 375/240.25 |
| 2012/0147954 A1 | 6/2012 | Kasai et al. |
| 2015/0127846 A1 | 5/2015 | Kasai et al. |

FOREIGN PATENT DOCUMENTS

| | | |
|---|---|---|
| JP | 2008-199387 A | 8/2008 |
| JP | 2011-024018 A | 2/2011 |
| JP | 2013-093656 A | 5/2013 |

OTHER PUBLICATIONS

Mar. 2, 2017 Extended Search Report issued in European Patent Application No. 14833803.1.

\* cited by examiner

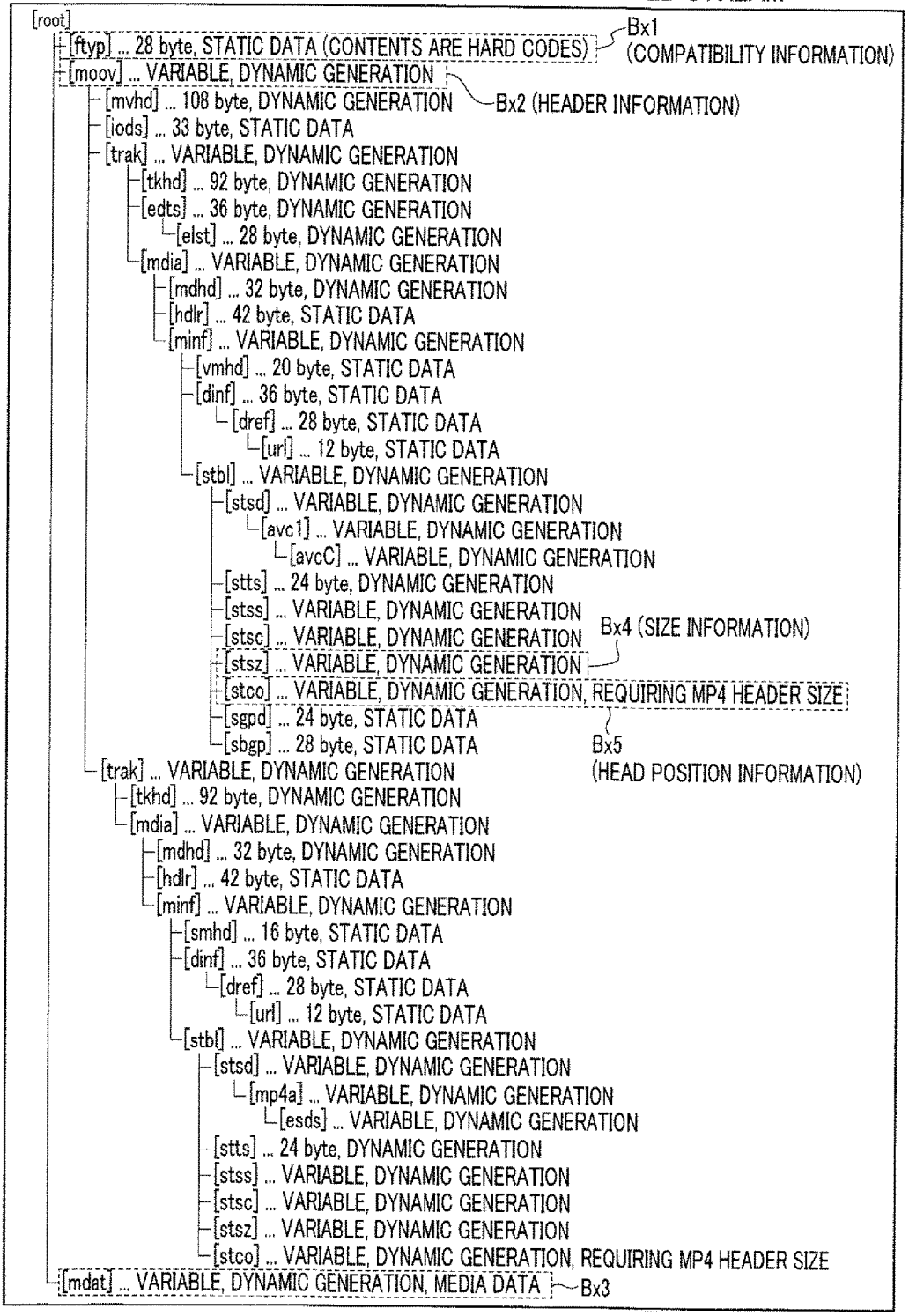
FIG. 6  DATA STRUCTURE OF MULTIPLEXED STREAM

FIG. 7  DATA STRUCTURE OF stsz BOX Bx4

```
aligned(8) class SampleSizeBox extends FullBox('stsz',version = 0, 0) {
    unsigned int(32) sample_size;
    unsigned int(32) sample_count;  ──E1
    if (sample_size==0) {
        for (i=1; I <= sample_count; i++) {
            unsigned int(32) entry_size;  ──E2
        }
    }
}
```

FIG. 8  DATA STRUCTURE OF stco BOX Bx5

```
aligned(8) class ChunkOffsetBox extends FullBox('stco',version = 0, 0) {
    unsigned int(32) entry_count;  ──E3
    for (i=1; I <= entry_count; i++) {
        unsigned int(32) chunk_offset;  ──E4
    }
}
```

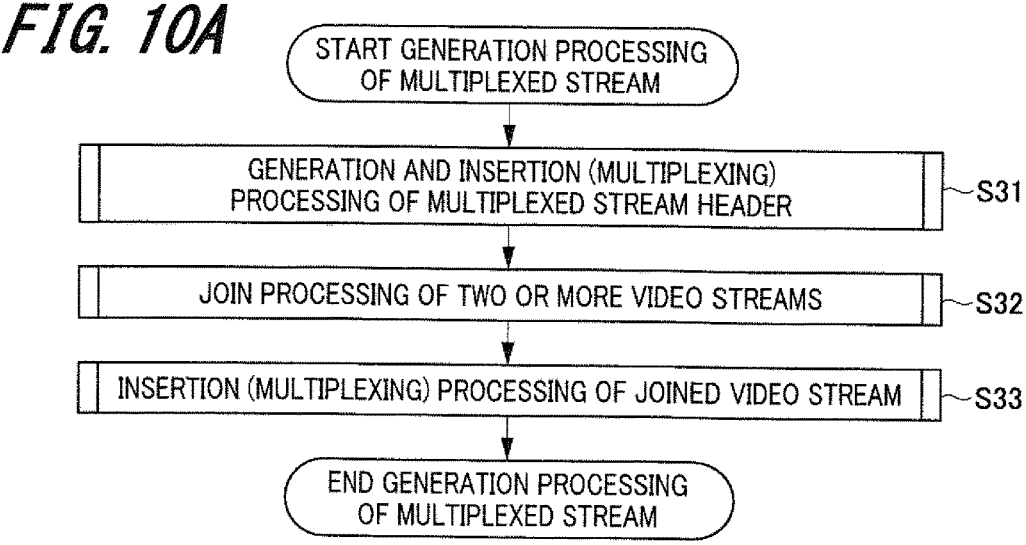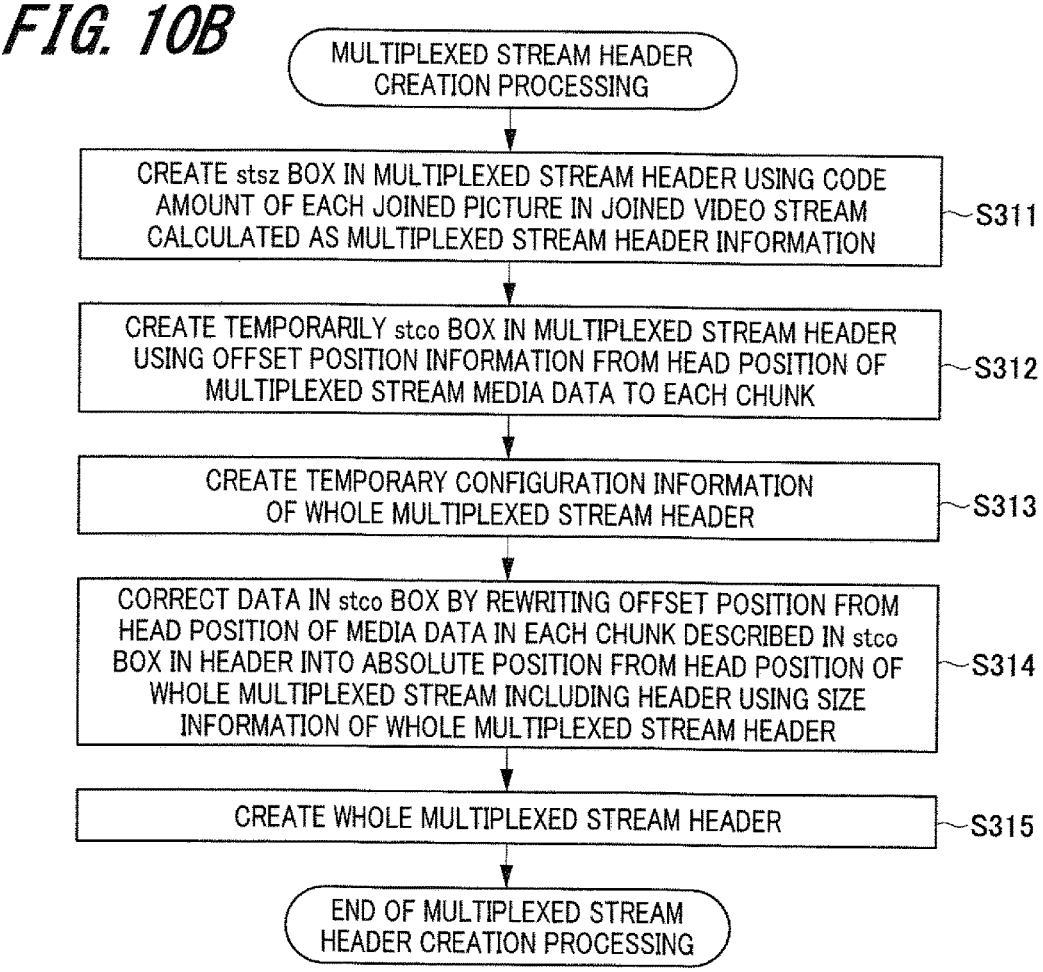

DATA PROCESSING DEVICE, DATA PROCESSING METHOD, PROGRAM, RECORDING MEDIUM, AND DATA PROCESSING SYSTEM

TECHNICAL FIELD

The present invention relates to a data processing device, a data processing method, a program, a recording medium, and a data processing system.

BACKGROUND ART

In recent years, it has become possible to transmit a high definition picture to client terminals such as portable terminals in association with innovation of a moving image encoding technology including MPEG (Moving Picture Experts Group)-4, and development of a communication technology. For example, it has been practiced to transmit a single stream (hereafter, referred to as "joined stream") obtained by joining two or more picture encoding bit streams (hereinafter, referred to as "video stream") from a server to client terminals, after multiplexing the joined stream with an audio stream, control information such as synchronous reproduction information, and header information for transmission etc.

By joining two or more video streams to generate a joined stream and transmitting the joined stream as a multiplexed stream on the server side, it becomes unnecessary to synchronize with the server side at the time of receiving the two or more video streams on a receiving apparatus side. In addition, also when two or more images are intended to be displayed simultaneously in respective positions of divided regions of a display screen, it becomes unnecessary to perform decoding processing and display processing simultaneously or to take display synchronization among two or more images. Therefore, it becomes possible to perform decoding and displaying of video streams easily in not only a computer having a high processing ability, but also in various types of receiving apparatuses such as a portable terminal and an embedded device.

For example, it is disclosed in PTL 1 that a single stream obtained by joining two or more video streams is transmitted from a server to client terminals.

CITATION LIST

Patent Literature

PTL 1: Japanese Patent Laid-Open No. 2011-24018

SUMMARY OF INVENTION

Technical Problem

Meanwhile, the video streams is usually transmitted as a multiplexed stream as mentioned above. As a file format of the multiplexed stream, MPEG-2 TS (Transport Stream) for broadcast/communication and MPEG-2 PS (Program Stream) or MP4file format for storing are used widely. In motion picture distribution services via the Internet which have become used widely in recent years, the MP4 file format is used usually.

The MP4 file format is a file format originally specified for storing a video stream and an audio stream in a file, and a header is arranged at the head of the file usually. Position information of each picture which constitutes a video stream in the file and information of a data size (code amount) of each picture, etc. are included in the header.

Therefore, when two or more video screams are joined to generate a single stream and the header thereof like a technology disclosed in PTL 1, it is necessary to generate a joined video stream once by joining two or more video streams before carrying out multiplexing processing. The reason is that information to be included in the header such as information of a position in the file of each picture which constitutes a video stream and a code amount of each of the pictures does not become clear unless the joined video stream is actually generated.

In generation processing of the joined video stream, processing to extract a picture data part of the picture to be joined from two or more video streams is performed first. However, in which position the picture data exists in the video stream does not become clear unless the video stream is analyzed from the head to the end. Therefore, analysis of the video stream is carried out first, and thereafter, processing to extract picture data is performed. Thereafter, processing to join two or more extracted picture data parts to generate a sheet of joined picture is performed as much as the necessary number of sheets of joined picture. Since such processes are carried out, very long time is required for generation processing of the joined video stream.

In the conventional method, unless generation processing of the joined video stream requiring such a long processing time like this has been completed, the header of the multiplexed stream has not been able to be created. That is, the period after generation of the multiplexed stream has been requested until creation of the header of the multiplexed stream is started has become very long. When an amount of data of the video stream itself or an amount of data of the joined video stream is large, the delay will become more remarkable.

The present invention is made in view of such point, and an object of the present invention is to enable creation of the header of the multiplexed stream to be started earlier.

Solution to Problem

A data processing device according to one aspect of the present invention is configured to include a data size calculation unit, a header creation unit, a joined video stream generation unit, and a multiplexed stream output unit, and a configuration and function of each unit are made to be as follows. That is, the data size calculation unit is assumed to join a first frame which is a frame to be joined inside a first video stream having a first picture signal encoded by a prescribed encoding method and a second frame which is a frame to be joined inside a second video stream different from the first video stream. Then, a data size of a joined frame generated finally in such a case is calculated. The header creation unit creates a header of a multiplexed stream which is a stream including a joined video stream made up of the joined frame using data size information of the joined frame. The joined video stream generation unit generates the joined video stream. The multiplexed stream output unit performs output processing of the header of the multiplexed stream or outputs the multiplexed stream including the joined video stream.

In addition, a data processing method according to one aspect of the present invention is first assumed to join a first frame which is a frame to be joined inside a first video stream having a first picture signal encoded by a prescribed encoding method and a second frame which is a frame to be joined inside a second video stream different from the first video stream. Then, a data size of a joined frame generated in such a case is calculated. Next, a header of a multiplexed stream which is a stream including a joined video stream made up of the joined frame is created using data size information of the joined frame. Next, the joined video stream is generated. Next, output processing of the header of the multiplexed stream or output of the multiplexed stream including the joined video stream is performed.

In addition, a program according to one aspect of the present invention is a program causing a computer to realize the following processing procedures (a) to (d).
(a) A procedure to calculate a data size of a joined frame generated if an assumption is made that a first frame which is a frame to be joined inside a first video stream having a first picture signal encoded by a prescribed encoding method and a second frame which is a frame to be joined inside a second video stream different from the first video stream are joined.
(b) A procedure to generate a header of a multiplexed stream which is a stream including a joined video stream made up of the joined frame using data size information of the joined frame.
(c) A procedure to generate the joined video stream.
(d) A procedure to perform output processing of the header of the multiplexed stream or output the multiplexed stream including the joined video stream.

In addition, in a recording medium according to one aspect of the present invention, a program for causing a computer to realize processing procedures (a) to (d) is recorded.

In addition, a data processing system according to one aspect of the present invention is configured to include a data size calculation device, a header creation device, a joined video stream generation device, and a multiplexed stream output device, and a configuration and function of each device are made to be as follows. The data size calculation device is assumed to join a first frame which is a frame to be joined inside a first video stream having a first picture signal encoded by a prescribed encoding method and a second frame which is a frame to be joined inside a second video stream different from the first video stream. Then, a data size of a joined frame generated in such a case is calculated. The header creation device creates a header of a multiplexed stream which is a stream including a joined video stream made up of the joined frame using data size information of the joined frame. The joined video stream generation device generates the joined video stream. The multiplexed stream output device performs output processing of the header of the multiplexed stream or outputs the multiplexed stream including the joined video stream.

Advantageous Effects of Invention

According to one aspect of the present invention, the header of the multiplexed stream is created not by actually joining two or more video streams, but by calculating the data size of the joined frame obtained when joining the two or more video streams and using the data size information of the joined frame obtained by the calculation. Therefore, it becomes possible to start creation of the header of the multiplexed stream earlier as compared with the conventional method where the header of the multiplexed stream is created after the joined frame has been generated actually.

BRIEF DESCRIPTION OF DRAWINGS

FIG. 6 is an explanatory view illustrating an example of a data structure of the multiplexed stream according to the first embodiment of the present invention;

FIG. 7 is an explanatory view illustrating a configuration example of a stsz box in a header of the multiplexed stream according to the first embodiment of the present invention;

FIG. 8 is an explanatory view illustrating a configuration example of a stco box in the header of the multiplexed stream according to the first embodiment of the present invention;

FIG. 10A is a flowchart illustrating an example of generation processing of the multiplexed stream according to the first embodiment of the present invention;

FIG. 10B is a flowchart illustrating an example of creation processing of a multiplexed stream header according to the first embodiment of the present invention;

DESCRIPTION OF EMBODIMENTS

Figure 1:
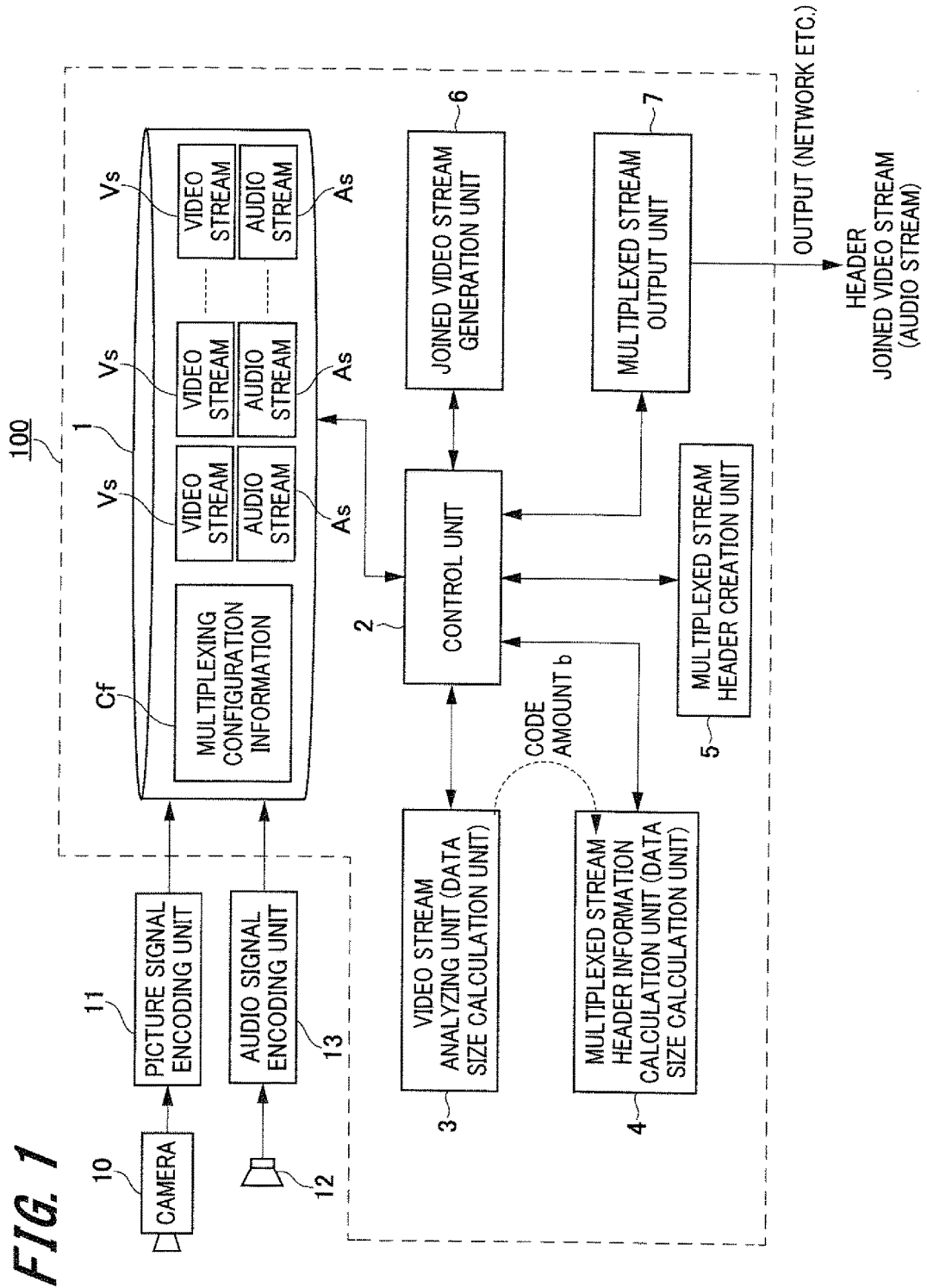
FIG. 1 is a block diagram illustrating a configuration example of a data processing device according to a first embodiment of the present invention.

In one aspect of the present invention, a header is created in advance, ahead of join processing of video streams which has the most processing amount in a case where a joined video stream is generated from two or more video streams (video signals), and the joined video stream is multiplexed with header information. Thereby, reducing a delay of a streaming (transmission) start time is realized. In addition, in one aspect of the present invention, it is not necessary to store in a memory etc. a video stream joined temporarily. Therefore, in one aspect of the present invention, writing processing into a memory, a disk or the like which will become the most bottleneck in a signal processing delay will become unnecessary.

Here, creating "header" ahead of the join processing of video streams may be impossible, in principle, without "the joined video stream made up of two or more video streams" which will be an object to be multiplexed. The reason is that code amount information for every joined picture which is included in "the joined video stream made up of two or more video streams" (for example, a stsz box in an MP4 format) and information on where the joined picture is located "inside the multiplexed stream" that is final (for example, a stco box in an MP4 format) are included in the header, and these are necessary to be known "in advance (before joining)."

Conventionally, there has been no such a concept (request) as "the joined video stream made up of two or more video streams" originally. The reason is that "single video stream" exists at hand (locally) in a distribution server already, and information constituting the above-mentioned header exists at hand. In addition, originally, if a file is prepared for the purpose of transmitting a multiplexed video stream, it is usual (YouTube (registered trademark) etc.) to prepare in advance files of an MP4 format or the like storing the multiplexed video stream. Therefore, there has been no need to generate dynamically a stream having such a format.

However, "the joined video stream made up of two or more video streams" targeted in one aspect of the present invention has a video stream to be joined dynamically determined only with a viewing and listening request from a user (viewer) etc. Therefore, "the joined video stream made up of two or more video streams" which will be an object to be multiplexed does not exist in advance, and as the result, information (material information) constituting the above-mentioned header does not exist at hand.

Consequently, it will become the biggest problem how "material information" constituting a header which does not exist is obtained before "the joined video stream made up of two or more video streams" is obtained. With respect to the problem, in the present invention, it is made possible to estimate (predict) and calculate the header size or the like in advance depending on "a joining algorithm (encoding method)".

In the joining algorithm, various kinds of processing such as correction and addition of a compressed code and insertion of a correction macro block code are performed in "a compression space" or "a non-compression space". When a joining algorithm is clear, it becomes possible to estimate "in advance" a code amount of each joined picture of "the joined video stream made up of two or more video streams". Here, "in advance" indicates persistently "in advance" after two or more video streams which will become objects to be joined have been determined.

Note that, "joining algorithm" has been disclosed already in Japanese Patent No. 5069658, Japanese Patent Laid-Open No. 2013-93656, and Japanese Patent Laid-Open No. 2013-98596 which have been made by the present inventors. It becomes possible to estimate a size, etc. of a header by applying these "joining algorithms" and other algorithms. In one aspect of the present invention, a type of a joining algorithm or other algorithms is not specified.

Thereby, since a code amount of each joined picture of a joined video stream becomes clear, it will become possible to create "in advance" a code amount information which is first information in a header (for example, a stsz box).

On the other hand, it also becomes a problem how information (for example, a stco box) indicating where the joined picture is located "inside the multiplexed stream" that is final is created. It is necessary to describe an offset position from a head of the final multiplexed stream as "the information indicating where the joined picture is located". However, there is a problem that unless a size (length) of the header part becomes clear, the preceding offset position is not determined finally in the multiplexed stream constituted by "a header part+a media part" of an MP4 format or the like.

Here, the case is assumed where a size of the information indicating where the joined picture is located "inside the multiplexed stream" that is final is constituted by "the number of all joined picture frames multiplied by fixed-length bytes" like an MP4 format. A point of the present invention is that, first, with respect to the head position of the joined picture, "a relative position" from the media part head excluding the header is determined, and information on a temporary head position of the joined picture is created. Then, the temporary whole header part is created in advance including all other pieces of information (header groups) including them. At this time point, the header part cannot be transmitted to a receiving side yet.

The size (length) of the whole header part becomes clear at a stage where creating of the temporary header part up to the tail end is completed. Then, "correction processing" with respect to "the information indicating where the joined picture is located "inside the multiplexed stream" that is final inside the header is started based on the size information of the whole header part. Specifically, processing to correct the preceding "relative position" information to "absolute position" information is performed.

The header part also comes into a state of "completion of the creation" finally at a stage where the processing is completed. Then, after that, It becomes possible to transmit the header part to the receiving side. Note that, the final "joined video stream made up of two or more video streams" has not been generated yet at the stage. Therefore, it is possible to perform the processing so far very simply, and since the joined video stream generation which is necessary in a conventional method has not been performed, it is not necessary to store the joined video stream in a memory or the like, and it is not necessary to perform writing processing into a memory, a disk or the like.

In one aspect of the present invention, as soon as transmission of the header part has been completed, creation processing of "the joined video stream made up of two or more video streams" is started finally. Then, as soon as the join processing for every corresponding picture in the two or more video streams is completed, joined pictures are multiplexed into the media part and transmitted for every joined picture.

Then, transmission of the multiplexed stream is completed at a stage where the last joined picture is transmitted.

Hereinafter, an example of a data processing device and a data processing method according to various embodiments of the present invention will be described with reference to drawings.

[First Embodiment]

<Configuration Example of Data Processing Device>

First, a configuration example of a data processing device 100 according to a first embodiment will be described with reference to FIG. 1. The data processing device 100 includes a storage unit 1, a control unit 2, a video stream analyzing unit 3, a multiplexed stream header information calculation unit 4, a multiplexed stream header creation unit 5 as a header creation unit, a joined video stream generation unit 6, and a multiplexed stream output unit 7.

The storage unit 1 is made up of an HDD (Hard Disk Drive) etc., and a video stream Vs, an audio stream As and a multiplexing configuration information Cf are stored in the storage unit 1. The video stream Vs denotes a picture bit stream where a picture signal photographed with a camera 10 is encoded by a picture signal encoding unit 11. An encoding method may be any kind of method such as MPEG-1, MPEG-2, MPEG-4 and H.264/AVC.

The audio stream As is an audio bit stream in which an audio signal generated with microphone 12 is encoded by an audio signal encoding unit 13.

The multiplexing configuration information Cf is a configuration file in the case of joining two or more video streams Vs to generate a joined video stream, that is, a configuration file in which design information, etc. of the joined video stream are written. The multiplexing configuration information Cf may be created manually, and may be created automatically when a desired video stream Vs is selected by a user as an object to be joined, etc. Details of the joined video stream will be described later with reference to FIGS. 2 and 3. In addition, also details of the multiplexing configuration information Cf will be described later.

The control unit 2 is made up of a CPU (Central Processing Unit) etc., and controls each block which constitutes the data processing device 100. Specifically, the control unit 2 performs processing, such as processing of reading out a video stream Vs selected as an object to be joined from the storage unit processing of receiving and delivering data between each of blocks, and processing of instructing execution of various processes to each of blocks.

The video stream analyzing unit 3 analyzes each video stream Vs extracted as an object to be joined based on an instruction from the control unit 2. Thereafter, the video stream analyzing unit 3 outputs the analysis result to the control unit 2. Details of processing of the video stream analyzing unit 3 will be described later with reference to FIG. 4.

The multiplexed stream header information calculation unit 4 calculates information necessary for multiplexed stream header creation based on information obtained by the analysis of the video stream analyzing unit 3. The multiplexed stream means a stream in which the joined video stream with two or more video streams Vs joined and the audio stream As are multiplexed. The multiplexed stream including such joined video stream is in a state where two or more video streams Vs are multiplexed. In the present embodiment, multiplexing the joined video stream with the audio stream As is performed by a method based on an MP4 format standard, for example. Details of processing of the multiplexed stream header information calculation unit 4 will be described later with reference to FIG. 5. Note that, a stream including at least a joined video stream is included in a multiplexed stream in a broad sense. That is, the multiplexed stream may be a stream including only joined video stream.

The multiplexed stream header creation unit 5 creates a multiplexed stream header using the information necessary for multiplexed stream header creation, which is calculated by the multiplexed stream header information calculation unit 4. Note that, details of processing of the multiplexed stream header creation unit 5 will be described later with reference to FIGS. 6 to 8.

The joined video stream generation unit 6 performs processing to join actually each video stream Vs extracted as an object to be joined to generate the joined video stream, based on control of the control unit 2.

The multiplexed stream output unit 7 outputs a header created by the multiplexed stream header creation unit 5 based on control of the control unit 2. In addition, the multiplexed stream output unit 7 multiplexes the joined video stream generated by the joined video stream generation unit 6 with the audio stream As, and outputs the resultant stream as a multiplexed stream. Note that, although an example of multiplexing the video stream Vs and audio stream As has been given in the present embodiment, the present invention is not limited to this As mentioned above, it may be configured such that a joined video stream having only video streams Vs joined is outputted as a multiplexed stream.

[Joined Video Stream]

Next, the joined video stream will be described with reference to FIGS. 2 and 3. The joined video stream Ms is made up of N joined pictures (joined frame) Pcm as illustrated as (2-1) of FIG. 2. In the (2-1), the N joined pictures are illustrated by a joined picture Pcm1 to a joined picture PcmN. In subsequent descriptions, the joined picture Pcm1 to the joined picture PcmN, when not discriminated in particular, are written as joined pictures Pcm. Each of the joined pictures Pcm is generated by joining of pictures Pc which correspond to each other among two or more video streams Vs illustrated in (2-2), of FIG. 2. For example, a joined picture Pcmn in the joined video stream Ms illustrated in (2-1) is generated by joining of respective pictures Pcm in a video stream Vs1 to a video stream VsM which are illustrated in (2-2). A screen displayed by the joined picture Pcmn is a screen which is divided into two or more small screens corresponding to two or more video streams which are objects to be joined. The correspondence of pictures Pc to be joined in two or more video streams Vs is determined automatically in accordance with a head position etc. of each video stream Vs, or selectively by a user etc.

Figure 2:
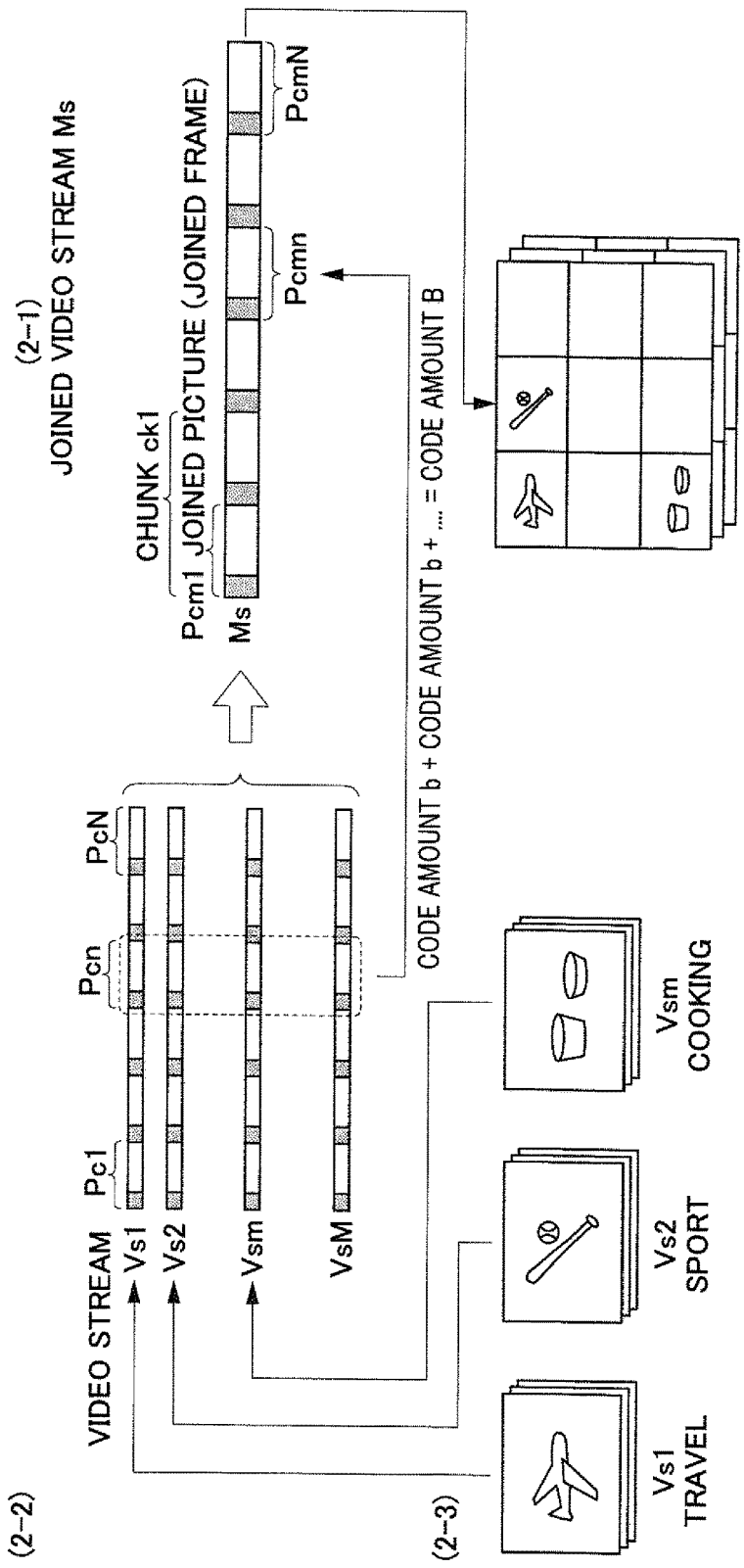
FIG. 2 is an explanatory view illustrating a configuration example of a joined video stream according to the first embodiment of the present invention.

As illustrated in (2-3) of FIG. 2, the video streams Vs are video streams having each different contents (travel, sports or cooking, etc.) for example. In (2-1) of FIG. 2, a video stream of travel is displayed on a small screen at the left end of the first row of a screen divided into nine, and in the same way, a video stream of sports is displayed on a small screen at a center of the first row, and a video stream of cooking is displayed on a small screen at the left end of the third row. Thus, two or more motion pictures are joined into one motion picture (picture), and distributed suitably as necessary in the present embodiment. Therefore, since two or more motion pictures are distributed as one motion picture (picture), each motion picture can be reproduced simultaneously using a video player mounted on a usual PC, a TV set box, a smart phone or a web browser etc., on a receiving side which receives the picture.

Figure 3:
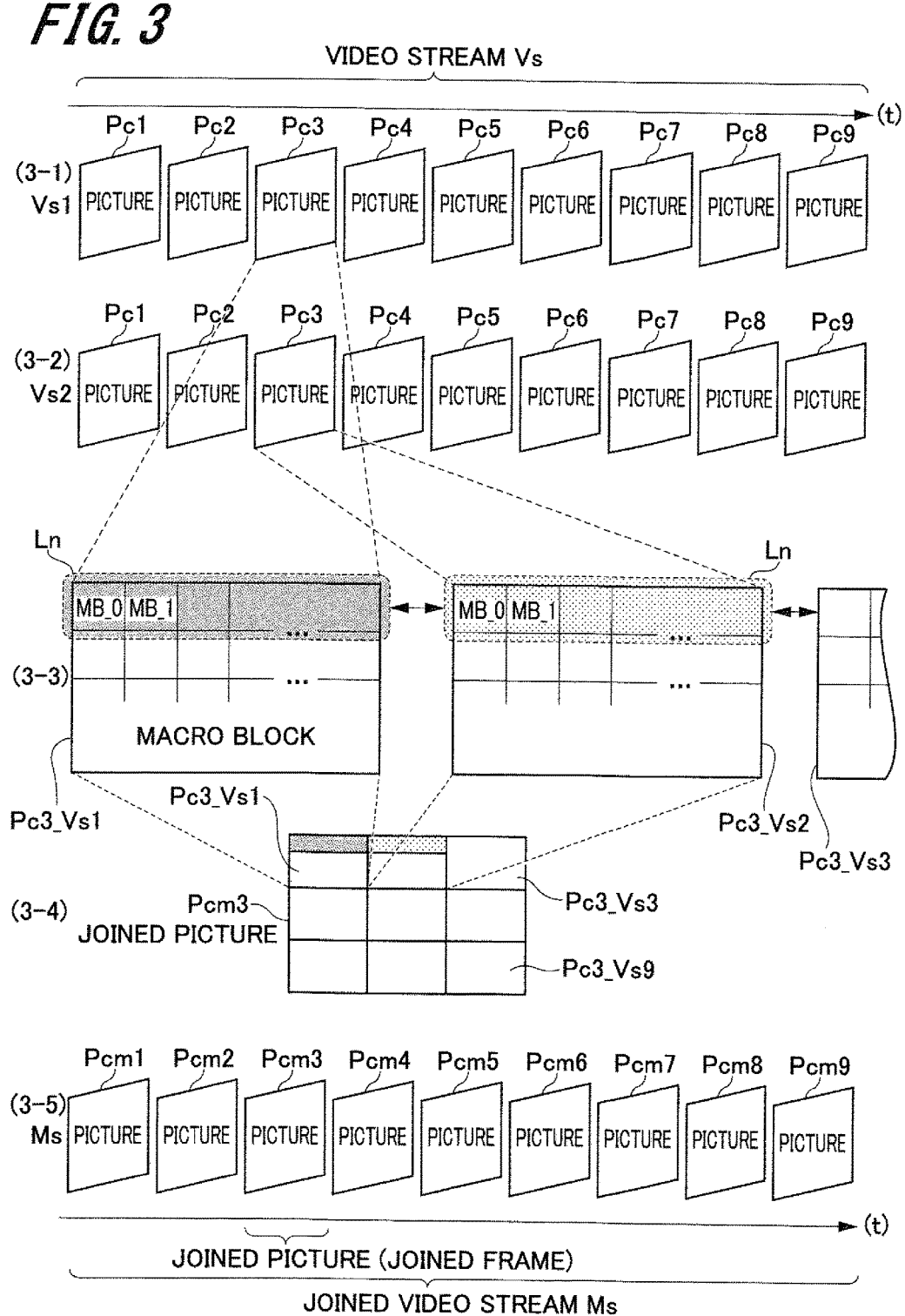
FIG. 3 is an explanatory view illustrating a configuration example of a video stream to be joined, and a configuration example of the joined video stream according to the first embodiment of the present invention.

FIG. 3 Illustrates details of configurations of two or more video streams Vs extracted as objects to be joined and the joined video stream Ms. Configuration examples of the video stream Vs1 and the video stream Vs2 which are extracted as objects to be joined are illustrated in (3-1) and (3-2) of FIG. 3. Note that, only picture Pc1 to picture Pc9 are illustrated among pictures Pc which constitute the video stream Vs1 and the video stream Vs2 in (3-1) and (3-2) of FIG. 3.

(3-3) of FIG. 3 indicates an image of join processing in a case where a picture Pc3 (first frame) of the video stream Vs1 (first video stream) and a picture Pc3 (second frame) of the video stream Vs2 (second video stream) are joined. A picture Pc3_Vs1 of the video stream Vs1 is illustrated in the left figure of (3-3) of FIG. 3, and a picture Pc3_Vs2 of the video stream Vs2 is illustrated in the center figure.

In the present embodiment, joining of pictures Pc is performed in the unit of 1 line of a macro block line Ln in which macro blocks (MB_0, MB_1, . . . ) are arranged. In (3-3), the left end of the macro block line Ln1 of the first line of the picture Pc3_Vs2 of the video stream Vs2 of the center figure is connected to the right end of the macro block line Ln1 of the first line of the picture Pc3_Vs1 of the left figure. In the same way, the left end of the macro block line Ln1 of the first line of a picture Pc3_Vs3 of the video stream Vs3 of the right figure is connected to the right end of the macro block line Ln1 of the first line of the picture Pc3_Vs2 of the center figure.

Note that, the unit of connecting pictures Pc is not limited to the example, and other units, such as the unit of two or more macro blocks, the unit of two or more macro block lines Ln, and the unit of the whole pictures Pc may be used.

Thus, by joining of pictures Pc3 of two or more video streams Vs, a joined picture Pcm3 (joined frame) of the joined video stream Ms is generated as illustrated in (3-4) of FIG. 3. Illustrated is an example where the joined picture Pcm3 is constituted by nine sheets of pictures (picture Pc3_Vs1 to picture Pc3_Vs9) in (3-4) of FIG. 3.

Other joined pictures Pcm are generated in the same way, and thereby, the joined video stream Ms which is made up of two or more joined pictures Pcm (joined picture Pcm1 to joined picture Pcm9 in an example illustrated in (3-5) of FIG. 3) as illustrated in (3-5) of FIG. 3 is generated finally.

Note that, the video streams Vs extracted as objects to be joined, when they are encoded with a standard adopting in-screen prediction encoding such as H.264/AVC, are needed to be joined while blocks referred to by the in-screen prediction encoding are also included. The in-screen prediction encoding is a method in which a prediction image is generated from pixel values in adjacent encoded blocks, and a difference from the prediction image is encoded. In addition, a specially devised encoding method may be adopted for the purpose of preventing possible image quality deterioration in a case of joining video streams Vs encoded with the standard adopting the in-screen prediction encoding, and in such a case, additive encoding information which becomes necessary for the purpose of realizing the image quality deterioration prevention is also joined together.

In addition, in FIG. 3, illustrated is an example where the picture Pc is made up of two or more slices (macro block line Ln), and each macro block (MB_0, MB_1, . . . ) which constitutes the slice is arranged continuously in order from the left side to the right side and from the upper side to the lower side. By joining pictures Pc having such structure to generate the joined picture Pcm, the unit of encoding becomes a joined picture Pcm unit after the generation of the joined picture Pcm. However, a picture Pc having a structure other than such structure may be an object to be joined. For example, when a picture Pc having a tile structure in H.265 and a picture Pc encoded in a mode referred to as "Flexible Macroblock ordering" in H.264 are joined, the structure which each picture Pc possesses before the joining is succeeded as it is also after the joining. That is, when pictures Pc having such structure are joined, joining may be made with the whole picture Pc as the unit.

Generation processing of the joined video stream Vs described with reference to FIGS. 2 and 3 is performed by the joined video stream generation unit 6 after completion of multiplexed stream header creation processing by the multiplexed stream header creation unit 5.

[Detail of Multiplexing Configuration Information]

Information necessary for generation of the multiplexed stream which is generated finally or information necessary for creation of the multiplexed stream header are described in the multiplexing configuration information Cf. In more detail, the multiplexing configuration information Cf is made up of e.g. the following items.

(1) Frame rate information of each video stream Vs extracted as the video stream Vs of an object to be joined (2) An infra-picture rate of each video stream Vs (for example, if the video stream Vs is encoded by the standard of H.264/AVC, "IDR (Instantaneous Decoding Refresh) frame rate" corresponds to it)

(3) Resolution of each video stream Vs (the number of pixels in the lateral direction and the number of pixels in the longitudinal direction)

(4) A coordinate position of each video stream Vs within the joined video stream Ms (the coordinate position in the lateral direction and the coordinate position in the longitudinal direction)

(5) A path (storage place) of each video stream Vs which constitutes the joined video stream Ms (6) The number of pictures Pc of the video stream Vs in the lateral direction of the joined video stream Ms (7) The number of pictures Pc of the video stream Vs in the longitudinal direction of the joined video stream Ms (8) The total number of frames of the joined video stream Ms (9) An output destination of the multiplexed stream which is generated finally (a path or a network address to the storage place)

Among the items included in the multiplexing configuration information Cf, (1) denotes information which is written in the multiplexed stream header. The information is used also for specifying in what kind of unit each chunk which constitutes media data (real data part) of the multiplexed stream is to be generated. The chunk is a logical unit of data in which two or more pictures (or audio data) are made into a group. For example, it is assumed that a length of one chunk is configured to be 0.5 seconds, and the frame rate described in (1) is 30 fps. In this case, the number of pictures which constitute one chunk will be 15. That is, one chunk may be generated while pictures for 15 sheets are made into a group.

Among the items included in the multiplexing configuration information Cf, (2) denotes information which is written in the multiplexed stream header. Information of the intra-picture rate of each video stream Vs described in (2) is referred to at the time of execution of random access on the side of a receiving apparatus which receives the multiplexed stream.

Note that, the above mentioned (1) and (2) may be obtained each time the video stream analyzing unit 3 analyzes the video stream Vs which is the object to be joined, without being described as the multiplexing configuration information Cf.

Among the items included in the multiplexing configuration information Cf, (3) to (8) denote information to which the joined video stream generation unit 6 refers when generating the joined video stream Ms. (3) to (5) denote information to specify which part of which video stream Vs is extracted from which place of the video stream Vs and arranged in which position of the joined video stream Ms. (6) to (8) denote information to specify the size of the joined video stream Ms in a lateral direction, in a longitudinal direction and in a time direction.

Also (3) of the multiplexing configuration information Cf may be obtained each time the video stream analyzing unit 3 analyzes the video stream Vs which is the object to be joined without being described in advance as the multiplexing configuration information Cf. However, if the information of (3) is described in advance in the multiplexing configuration information Cf, it becomes possible to detect anomalies with reference to the information of (3) when the video stream Vs in which the anomalies are included is inputted.

Among the items included in the multiplexing configuration information Cf, (9) denotes information which indicates a place of the output destination of the multiplexed stream which is generated finally. When the multiplexed stream is stored in a storage device or a storage medium, the path to the storage place is described. In addition, when the multiplexed stream is transmitted to a prescribed receiving apparatus via a network, the network address of the receiving apparatus is described.

Note that, information described in the multiplexing configuration information Cf is not limited to (1) to (8), and the other information may be added. For example, information to specify a range of pictures Pc of the video stream Vs extracted as the object to be joined may be described. For example, the extraction starting frame number and the number of extracted pictures in a picture group to be extracted for generation of the joined video stream Ms are described, and thereby, it also becomes possible to generate the joined video stream Ms by extracting pictures Pc in any position of the video stream Vs.

[Detail of Processing of Video Stream Analyzing Unit]

The video stream analyzing unit 3 analyzes each video stream Vs extracted as an object to be joined to obtain a picture type (type of a picture, such as an I picture, a P picture arid a B picture) of each picture which constitutes the video stream Vs. In addition, the video stream analyzing unit 3 calculates a code amount (data size) of each picture (frame) which constitutes the video stream Vs. That is, the video stream analyzing unit 3 functions as a data size calculation unit in other words.

Figure 4:
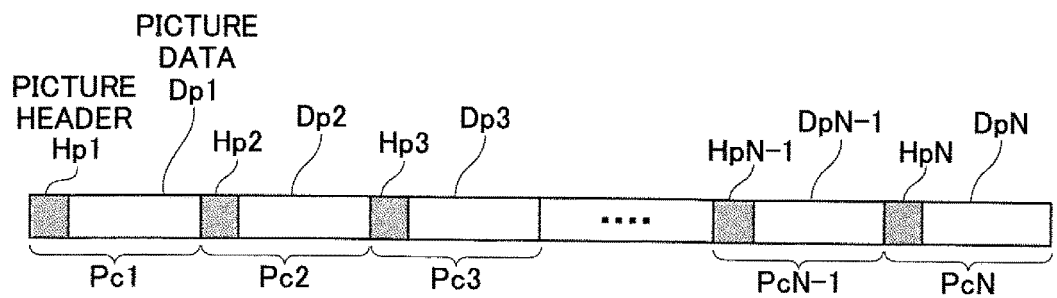
FIG. 4 is an explanatory view illustrating a configuration example of the video stream according to the first embodiment of the present invention.

FIG. 4 illustrates a configuration example of the video stream Vs. The video stream Vs is made up of two or more pictures Pc (the picture Pc1 to the picture PcN), and each picture Pc is made up of a picture header Hp (a picture header Hp1 to a picture header HpN) and picture data Dp (picture data Dp1 to picture data DpN).

The video stream analyzing unit 3, while making each video stream Vs a target, searches for the picture header Hp while carrying out shifting by 1 byte at a time from the head of the file. By performing search for the picture header Hp, a code amount b of the picture Pc1 of the video stream Vs1 (refer to FIGS. 1 and 2) becomes clear at the time of detecting the picture header Hp2 of the picture Pc2 of the video stream Vs1, for example.

The video stream analyzing unit 3 obtains the code amount b of all the pictures Pc which constitute the video stream. Vs by performing the header search processing from the head to the end of the video stream Vs.

[Detail of Processing of Multiplexed Stream Header Information Calculation Unit]

The multiplexed stream header information calculation unit 4 calculates information necessary for the multiplexed stream header creation using the information obtained as the result of the analysis by the video stream analyzing unit 3. The information necessary for the multiplexed stream header creation is information of a code amount B of the joined picture Pcm obtained if an assumption is made that pictures Pc in the different video streams Vs are joined, and a position of each chunk in the media data part of the multiplexed stream which is finally generated.

Figure 5:
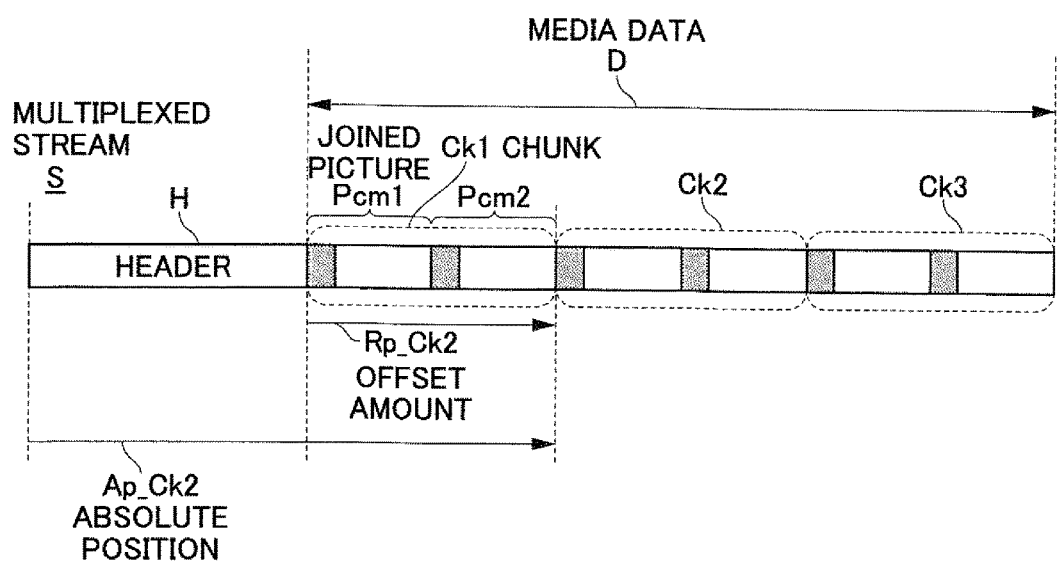
FIG. 5 is an explanatory view illustrating a configuration example of a multiplexed stream according to the first embodiment of the present invention.

FIG. 5 illustrates a configuration example of a multiplexed stream S. The multiplexed stream S is made up of a header H and media data D. The media data D is made up of two or more chunks Ck (a chunk Ck1 to a chunk Ck3 in the example of FIG. 5). Each chunk Ck is made up of two or more joined pictures Pcm. Note that, FIG. 5 illustrates an example where each chunk Ck which does not include the audio stream As and is made up only of the joined picture Pcm of the joined video stream Ms is constituted for simplifying description.

The multiplexed stream header information calculation unit 4 calculates the code amount B (refer to FIG. 2) of each joined picture Pcm which constitutes each chunk Ck by totaling the code amount b of each picture Pc calculated by the video stream analyzing unit 3. That is, the multiplexed stream header information calculation unit 4 also functions as a data size calculation unit. For example, the joined picture Pcmn in the joined video stream Ms illustrated in (2-1) of FIG. 2 is generated by joining of each picture Pcn of the video stream Vs1 to the video stream VsM illustrated in (2-2) of FIG. 2. Therefore, a value obtained by totaling the code amount b of each picture Pcn of the video stream Vs1 to the video stream VsM illustrated in (2-2) of FIG. 2 namely becomes the code amount B of the joined picture Pcmn illustrated in (2-1) of FIG. 2.

Note that, when an encoding method of also adding additive encoding information when joining pictures Pcn is used, a code amount obtained by adding a code amount of the additive encoding information to the code amount b of the picture Pcn becomes the code amount B. That is, the code amount 8 is calculated in consideration of a code amount which increases due to picture code correction and code adding processing at the time of code joining in addition to the code amount of the picture Pcn of the video stream before joining. For example, H.264/AVC performs, as one goal, processing to join compressed picture codes at an ultra-high speed in real time by a 1-core CPU, for responding to a viewing and listening request from hundreds to 1000 or more users. In H.264/AVC, a particular kind of picture code (corresponding to a video stream before joining) is generated by various kinds of encoding modal control or control of a variable length code which will be a stream in a byte unit (not in a bit unit) or the like. Then, for the purpose of achieving the above-mentioned goal, in H.264/AVC, a joined picture code stream (corresponding to the joined stream) based on H.264/AVC is generated without carrying out bit manipulation by correcting a code in a compressed state or adding a new code, dynamically, in accordance with a user's request with respect to the generated picture code.

When the code amount B of each joined picture Pcm which constitutes the joined video stream Ms becomes clear, the head position of each joined picture Pcm in the media data D of the joined video stream Ms also becomes clear. In addition, as mentioned above, the frame rate information described in the multiplexing configuration information Cf is referred to, and thereby, it becomes possible to obtain also information on with how many sheets of joined pictures Pcm as a group each chunk Ck constituting multiplexed stream S is to be formed. That is, the code amount B of each joined picture Pcm which constitutes the joined video stream Ms is calculated, and thereby, it becomes possible to also calculate the head position of each chunk Ck in the media data D of the multiplexed stream S which does not include the header H.

In the present embodiment, the head position of each chunk Ck in the media data D is expressed with an offset position (first position) which indicates a difference (offset amount) from the head position of the media data D. FIG. 5 describes as an example the offset position Rp_Ck2 of the head position of the chunk Ck2 from the head position of the media data D.

In other words, according to the present embodiment, information necessary for creation of the header H of the multiplexed stream S, that is, information with respect to the code amount B of each joined picture Pcm and the head position of each chunk Ck can be calculated without generating the joined video stream Ms by actually joining pictures Pc of two or more video streams Vs.

[Detail of Processing of Multiplexed Stream Header Creation Unit]

Subsequently, details of processing of the multiplexed stream header creation unit 5 will be described with reference to FIGS. 6 to 8. The multiplexed stream header creation unit 5 creates configuration information (structure body) of the header H of the multiplexed stream S using information calculated by the multiplexed stream header information calculation unit 4.

FIG. 6 illustrates an example of a data structure of the multiplexed stream S. The multiplexed stream S is generated as a file based on an MP4 file format as mentioned above. The multiplexed stream S is constituted as an aggregation of many pieces of BOX (box) information (constituent element). Each piece of box information is hierarchized for every category.

Information which indicates a compatibility of a file is stored in an ftyp box Bx1 existing in the top. The header information of the multiplexed stream S is stored in a moov box Bx1 thereunder. The media data D, that is, the joined video stream Ms and the audio stream As are stored in an mdat box Bx3.

Size information of each picture Pcm which constitutes each chunk in the media data D is stored in a stsz box Bx4 in the moov box Bx2. FIG. 7 illustrates an example of a data structure of the stsz box Bx4. As illustrated in FIG. 7, a size of each picture Pcm which constitutes each chunk is described as an entry_size (entry size) E2 as much as the number of pictures Pcm described as sample_count (sample count) E1 in the stss box Bx4.

Descriptions will be continued back in FIG. 6. In a stco box Bx5 in the moov box Bx2, head position information of each chunk which constitutes the media data D stored in the mdat box Bx3 is stored. FIG. 8 illustrates an example of a data structure of the stco box Bx5. As illustrated in FIG. 8, the head position information of each chunk which constitutes the media data D is described as a chunk_offset (chunk offset) E4 as much as an entry_count (entry count) E3 in the stco box Bx5.

The head position of each Chunk Ck is described as an offset position from the head position of the whole file including the header H of the multiplexed stream S. However, the head position of each chunk Ck is difficult to be calculated unless after a data size of the header H has become clear. In addition, the data size of the header H does not become clear unless after each constituent element which constitutes the header H has been described.

Therefore, conventionally, the video streams Vs are actually joined to generate the joined video stream Ms, and the generated joined video stream Ms is analyzed, and thereby, information necessary for creation of the header H has been obtained, and thereafter, generating the header H has been performed.

In contrast, in the present embodiment, the multiplexed stream header creation unit 5 creates the configuration information of the header H of the multiplexed stream S using the code amount B of each joined picture Pcm which constitutes each chunk Ck, the code amount B being calculated by the multiplexed stream header information calculation unit 4. At this time, an offset position (first position) from the head position of the media data D which do not include the header B is substituted temporarily as the head position of each chunk in the stco box Bx5 in the moov box Bx2 which has been mentioned above. Then, at the time when the data size of the header H is calculated by generation of the configuration information of the header H, a true head position (absolute position) of each chunk in the multiplexed stream is determined. That is, it is performed to rewrite the head position of each chunk which has been substituted temporarily in the stco box Bx5, i.e. the offset position (first position) from the head position of the media data D which does not include header H into the absolute position (second position) from the head position of the whole file including the header H. FIG. 5 indicates the absolute position from the head position of the whole file including the header H to the head position of the chunk Ck2 as a position Ap_Ck2.

<Example of Data Processing>

Figure 9:
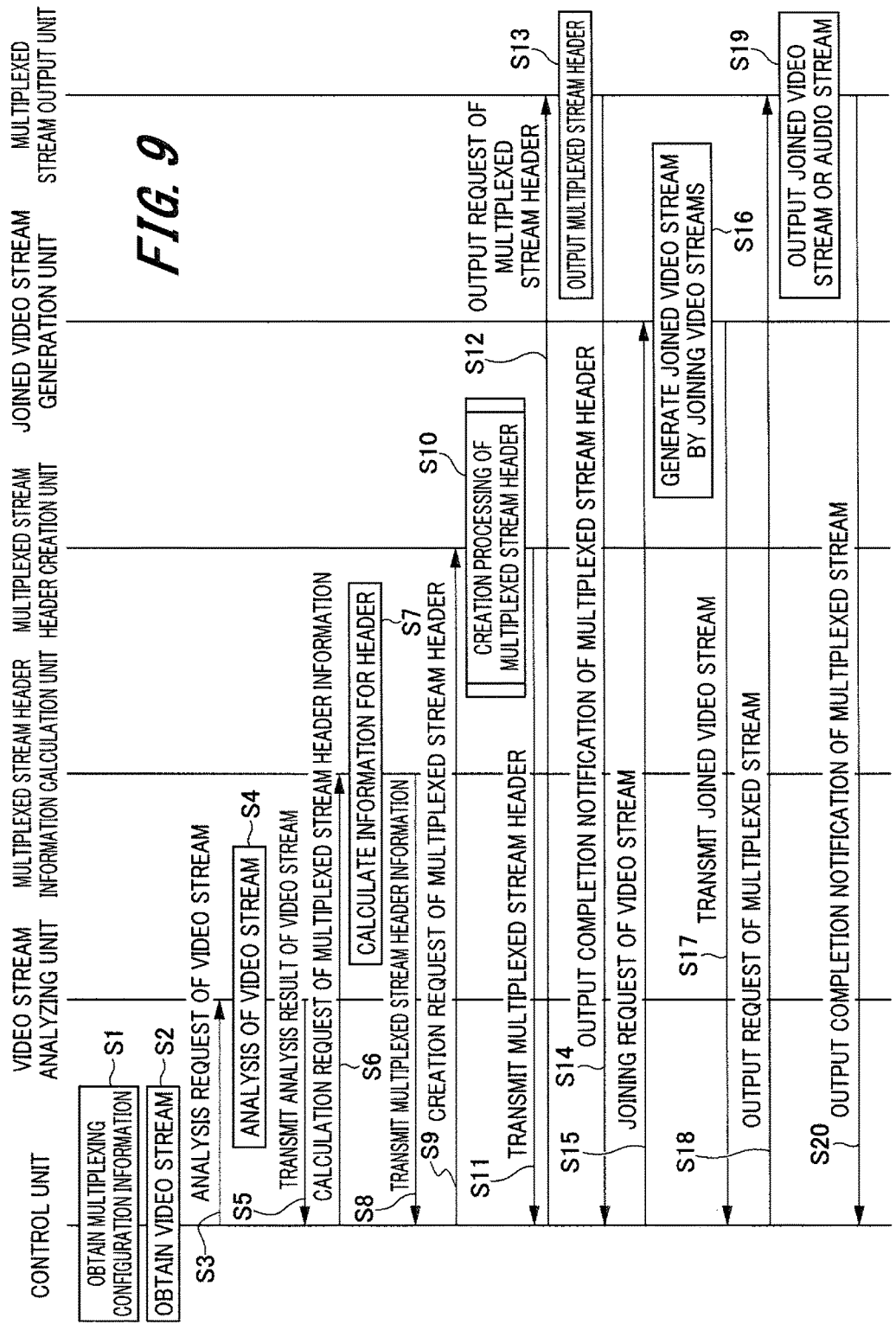
FIG. 9 is a flowchart illustrating an example of processing of the data processing device according to the first embodiment of the present invention.

Subsequently, an example of data processing according to the first embodiment will be described with reference to a flowchart of FIG. 9. First, the control unit 2 obtains the multiplexing configuration information Cf from the storage unit 1 (Step S1). Thereafter, the control unit 2 in the same way obtains two or more video streams Vs which have been made to be objects to be joined, based on information described in the obtained multiplexing configuration information Cf (Step S2). Next, the control unit 2 transmits an analysis request of the video stream Vs to the video stream analyzing unit 3 (Step S3). At this time, the control unit 2 transmits also two or more video streams Vs together with the analysis request of the video stream to be joined. Note that, as for the transmission of two or more video streams Vs, data may be transmitted as it is, but, only information of the path to the storage place of the video stream Vs may be transmitted.

When receiving the analysis request of the video stream to be joined transmitted from the control unit 2, the video stream analyzing unit 3 analyzes each video stream Vs extracted as the object to be joined (Step S4). The video stream analyzing unit 3 analyzes each video stream Vs extracted as the object to be joined, and thereby, calculates the code amount b of each picture Pc which constitutes each video stream Vs while obtaining the picture type of each picture Pc which constitutes each video stream Vs.

After obtaining the picture type of each picture Pc which constitutes each video stream Vs and the code amount b, the video stream analyzing unit 3 transmits these pieces of information to the control unit 2 as the analysis result of the video stream to be joined (Step S5).

Next, a calculation request of multiplexed stream header information is transmitted from the control unit 2 to the multiplexed stream header information calculation unit 4 (Step S6). In the calculation request of the multiplexed stream header information, analysis results of the video stream analyzing unit 3 (code amount b etc. of each picture Pc which constitutes each video stream Vs), and (1), (2), (6), (7) and (8) of the multiplexing configuration information Cf are included.

When receiving the calculation request of the multiplexed stream header information transmitted from the control unit 2, the multiplexed stream header information calculation unit 4 calculates the multiplexed stream header information (Step S7). The multiplexed stream header information calculation unit 4 calculates the code amount B of each joined picture Pcm which constitutes multiplexed stream S and information of the head position of each chunk Ck in the media data D of the multiplexed stream S as the multiplexed stream header information. Thereafter, the multiplexed stream header information calculation unit 4 transmits the created multiplexed stream header information to the control unit 2 (Step S8).

Next, a creation request of the multiplexed stream header is transmitted to the multiplexed stream header creation unit 5 from the control unit 2 (Step S9). The control unit 2 transmits also the multiplexed stream header information calculated by the multiplexed stream header information calculation unit 4, together with the creation request of the multiplexed stream header.

When receiving the creation request of the multiplexed stream header transmitted from the control unit 2, the multiplexed stream header creation unit 5 performs creation processing of the header H for the multiplexed stream S (Step S10). The creation processing of the multiplexed stream header will be described later with reference to FIG. 10B.

When completing creation processing of the multiplexed stream header, the multiplexed stream header creation unit 5 transmits the created header H for the multiplexed stream S to the control unit 2 (Step S11).

Next, an output request of the multiplexed stream header is transmitted from the control unit 2 to the multiplexed stream output unit 7 (Step S12). At this time, the control unit 2 transmits also the header H for the multiplexed stream S created in the multiplexed stream header creation unit 5, together with the output request of the multiplexed stream header.

When receiving the output request of the multiplexed stream header transmitted from the control unit 2, the multiplexed stream output unit 7 outputs the header H for the multiplexed stream S (Step S13). The header H for the multiplexed stream S outputted from the multiplexed stream output unit 7 is transmitted to the receiving apparatus etc. When completing outputting of the header H for the multiplexed stream S, the multiplexed stream output unit 7 notifies the control unit 2 of the output completion of the multiplexed stream header (Step S14).

Next, a joining request of video streams Vs is transmitted from the control unit 2 to the joined video stream generation unit 6 (Step S15). In the joining request of video streams Vs, the video stream Vs and (4), (6) to (8) of the multiplexing configuration information Cf are included.

When receiving the joining request of video streams Vs transmitted from the control unit 2, the joined video stream generation unit 6 generates the joined video stream Ms by joining two or more video streams Vs in the unit of the picture Pc (Step S16). Thereafter, the joined video stream generation unit 6 transmits the generated joined video stream Ms to the control unit 2 (Step S17). Note that, the transmission processing of the joining request of Step S15 and the generation processing of the joined video stream Ms of Step S16 are performed repeatedly until completion of joining of all the pictures Pc which have been objects to be joined.

Next, an output request, of the multiplexed stream S is transmitted from the control unit 2 to the multiplexed stream output unit 7 (Step S18). When receiving the output request of the multiplexed stream S transmitted from the control unit 2, the multiplexed stream output unit 7 performs multiplexing processing of the joined video stream Ms and the audio stream As. Then, the joined video stream Ms and the audio stream As on which the multiplexing processing has been performed are outputted as the multiplexed stream S (Step S19). When having completed the output of the multiplexed stream S, the multiplexed stream output unit 7 notifies the control unit 2 of the output completion of the multiplexed stream S (Step S20).

[Generation Processing of Multiplexed Stream]

Here, generation processing of the multiplexed stream will be described with reference to FIGS. 10A and 10B. FIG. 10A is a flowchart illustrating an overall processing procedure of the multiplexed stream. FIG. 10B is a flowchart illustrating an example of the creation processing of the multiplexed stream header (Step S31) of FIG. 10A.

In FIG. 10A, the multiplexed stream header creation unit 5 performs creation and insertion (multiplexing) processing of the multiplexed stream header first (Step S31). Next, the joined video stream generation unit 6 performs processing to join two or more video streams based on the multiplexed stream header created by the multiplexed stream header creation unit 5 (Step S32). Then, the multiplexed stream output unit 7 performs the insertion (multiplexing) processing of the joined video stream (Step S33). That is, in the present embodiment, the join processing of two or more video streams (Step S32) is performed after the creation processing of the multiplexed stream header (Step S31).

Note that, the above-mentioned insertion (multiplexing) processing means multiplexing as a multiplexed stream which finally outputs the created header or the joined video stream, or alternatively, multiplexing into a multiplexed stream. The multiplexed stream has the header and media data sequentially configured in accordance with a certain order, and the header and the joined video stream will be added one after another to the back end of the multiplexed stream. Then, during streaming, the header and joined video stream added earlier to the multiplexed stream are going to foe transmitted one by one to a network while such addition is performed. However, since the multiplexed stream which will be the object of insertion (multiplexing) does not exist in an early stage of the header creation, the header and the media data (joined video stream) are going to be added one by one to the back end of the head (the first byte) of the first header.

[Detail of Creation Processing of Multiplexed Stream Header]

Next, creation processing of the multiplexed stream header (Step S31 of FIG. 10A) by the multiplexed stream header creation unit 5 will be described with reference to FIG. 10B.

First, the multiplexed stream header creation unit 5 creates the stsz box Bx4 (refer to FIG. 6) in the header H of the multiplexed stream S using the code amount B of each joined picture Pcm which constitutes the joined video stream Ms, the code amount B being calculated as the multiplexed stream header information (Step S311). In other words, processing to write the code amount B of each joined picture Pcm in the entry size E2 of the stsz box Bx4 illustrated in FIG. 7 is performed.

Next, the multiplexed stream header creation unit 5 creates the stco box Bx5 in the header H of the multiplexed stream S using information of the offset position from the head position of the media data D of the multiplexed stream S to each chunk Ck, the information being calculated as the multiplexed stream header information (Step S312). That is, processing to write the offset position from the head position of the media data D of the multiplexed stream S at the head position of each chunk Ck in the chunk offset E4 of the stco box Bx5 illustrated in FIG. 8 is performed.

Subsequently, the multiplexed stream header creation unit 5 creates configuration information of the header H for the multiplexed stream S by performing also creation of each of other boxes which constitutes the header H (Step S313). At this time point, the size of the header H of the multiplexed stream S is fixed.

Next, the multiplexed stream header creation unit 5 performs processing to rewrite the value of the chunk offset E4 (refer to FIG. 8) of the stco box Bx5 in the header configuration information using information of the size of the header H for the multiplexed stream S. In more detail, processing to rewrite the offset position from the head position of the media data D in each chunk Ck, the offset position having been described as the chunk offset E4, into the absolute position from the head position of the whole multiplexed stream S including the header H is performed (Step: S314).

Thereafter, the multiplexed stream header creation unit 5 creates the header H for the multiplexed stream S (Step S315). That is, processing to binarize the header H is performed.

According to the first embodiment mentioned above, it becomes possible to generate and output the header H of the multiplexed stream S without performing processing to generate the joined video stream Ms by actually joining the video streams Vs. That is, even if the joined video stream Ms which constitutes a part of the media data D of the multiplexed stream S has not been generated, only the header H can be transmitted to the receiving apparatus side in advance. Thereby, it becomes possible to perform preparation of decoding processing early on the receiving apparatus side, and it will become possible to start picture reproduction in an early stage on the receiving apparatus side.

In addition, according to the first embodiment mentioned above, it becomes unnecessary to generate the joined video stream Ms in advance in creating the header H of the multiplexed stream S. Therefore, it becomes unnecessary to perform also processing to temporarily store the joined video stream Ms which has been generated for creating the header H in a storage medium, a storage device, or the like until the header H is created.

Thereby, a load itself to be applied to a CPU in the case of writing/reading the joined video stream Ms in/from the storage medium, the storage device or the like will not be generated. In addition, since time for writing/reading the joined video stream Ms in/from the storage medium, the storage device or the like also will not be generated, the time for processing can be shortened substantially. Furthermore, in the embodiment in which the multiplexed stream S is not stored in the storage unit 1 etc., but is outputted to a network, a capacity of the storage unit 1 can be reduced substantially since it is not necessary to store the joined video stream Ms in the storage unit 1 before the multiplexing processing is performed. Therefore, cost reduction of the data processing device 100 can also be achieved.

[Second Embodiment]

Although an example of analyzing the video stream Vs by the video stream analyzing unit 3 each time the multiplexing processing is performed has been given in the above-mentioned first embodiment, the present invention is not limited to this. The analysis result of the video stream Vs by the video stream analyzing unit 3 may be accumulated in a text file or a database, etc. as metadata of the video stream Vs.

Figure 11:
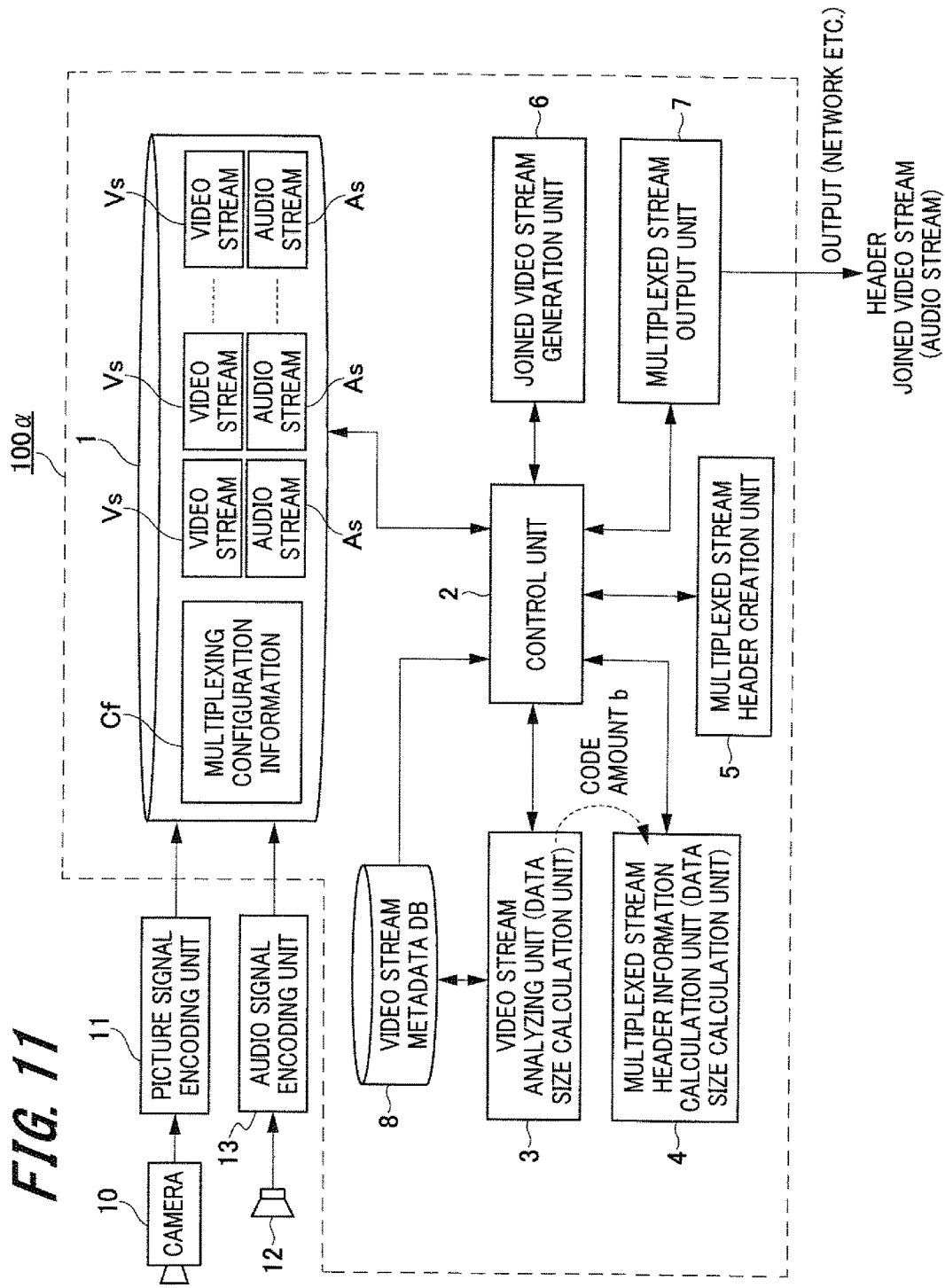
FIG. 11 is a block diagram illustrating a configuration example of a data processing device according to a second embodiment of the present invention.

FIG. 11 is a block diagram illustrating a configuration example of a data processing device 100α according to a second embodiment. In FIG. 11, the same symbol is given to a part corresponding to FIG. 1, and overlapped descriptions are omitted. The configuration illustrated in FIG. 11 is one in which a video stream metadata DB (database) 8 is added to the configuration illustrated in FIG. 1. The video stream metadata DB 8 is a database which accumulates the analysis result by the video stream analyzing unit 3 as metadata of the video stream Vs.

Figure 12:
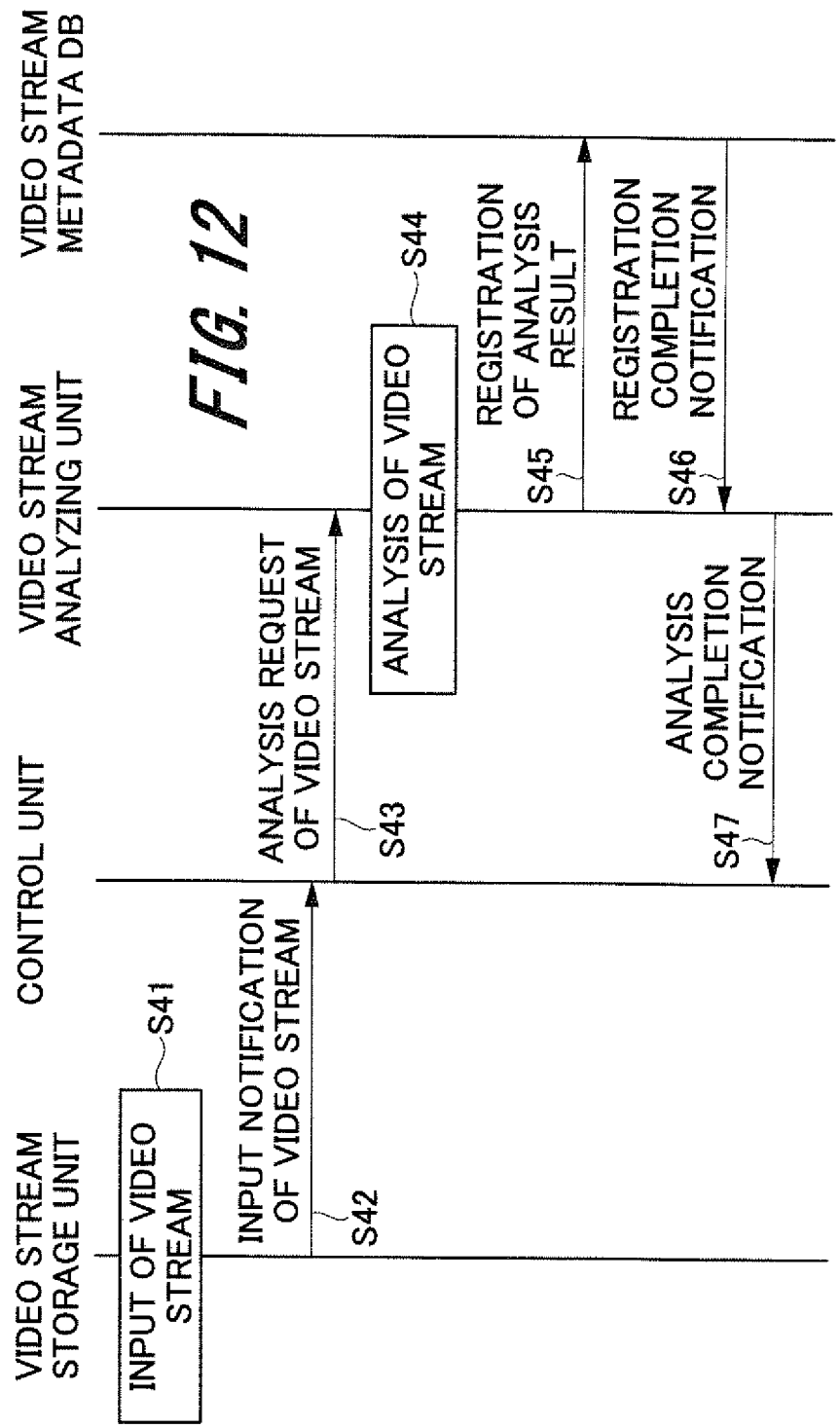
FIG. 12 is a flowchart illustrating an example of processing of the data processing device according to the second embodiment of the present invention.

FIG. 12 is a flowchart illustrating an example of data processing by the data processing device 100α. First, when the video stream Vs is transmitted and inputted to the storage unit 1 from the picture signal encoding unit 11, etc. illustrated in FIG. 11 (Step S41), an input notification of the video stream Vs is sent from the storage unit 1 to the control unit 2 (Step S42). In other words, the storage unit 1 notifies the control unit 2 of input of the new video stream Vs which is likely to be joined hereafter as the joined video stream Ms. At this time, the storage unit 1 transmits also position information of the video stream Vs which is newly inputted, together with the input notification of the video stream Vs. The position information of the video stream Vs means a path to the storage place of the video stream Vs and an identifier of the video stream Vs or the like, for example.

Next, the analysis request of the video stream Vs is transmitted from the control unit 2 to the video stream analyzing unit 3 (Step S43). The control unit 2 requests the video stream analyzing unit 3 to calculate the picture type of each picture Pc which constitutes the video stream Vs and the code amount b of each picture Pc as the analysis request of the video stream Vs. At this time, the control unit 2 transmits also the identifier of the video stream Vs together.

When receiving the analysis request of the video stream Vs transmitted from the control unit 2, the video stream analyzing unit 3 analyzes the video stream Vs (Step S44). The video stream analyzing unit 3 obtains the picture type of each picture Pc which constitutes the video stream Vs and the code amount of each picture Pc by analyzing the video stream Vs.

Subsequently, the video stream analyzing unit 3 registers the analysis result of the video stream Vs in the video stream metadata DB 8 as the metadata of the video stream Vs (Step S45). When completing the registration of the video stream Vs to the database, the video stream metadata DB 8 notifies the video stream analyzing unit 3 of the registration completion (Step S46). When receiving the registration completion notification transmitted from the video stream metadata DB 8, the video stream analyzing unit 3 notifies the control unit 2 of the completion of analysis of the video stream Vs (Step S47).

Processing from S41 to Step S47 in step figure FIG. 12 which are described hitherto is performed for all of the newly inputted video streams Vs each time the new video stream Vs is inputted to the storage unit 1.

Figure 13:
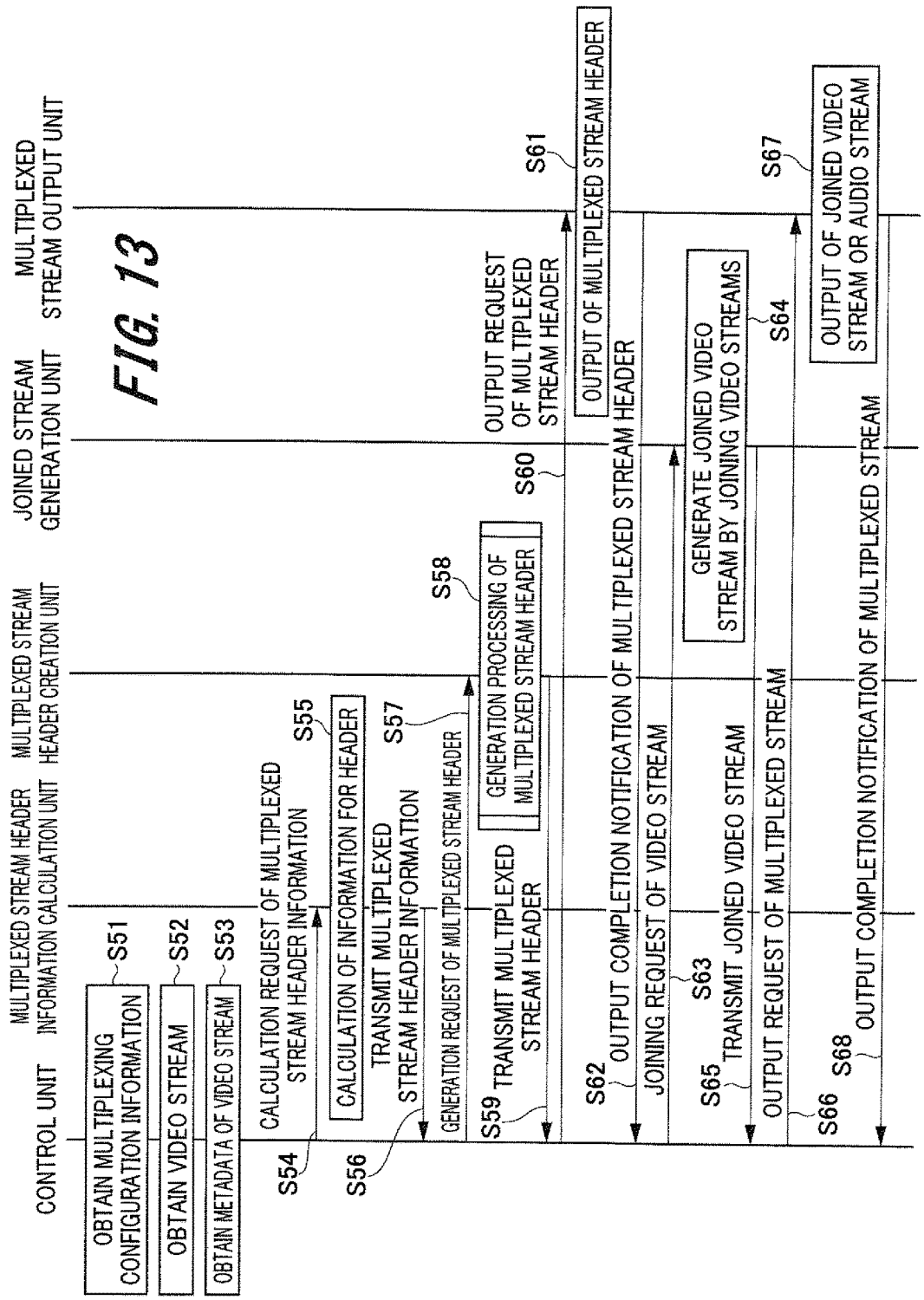
FIG. 13 is a flowchart illustrating an example of processing of the data processing device according to the second embodiment of the present invention.

FIG. 13 is a flowchart illustrating an example of the multiplexing processing by the data processing device 100α. Processing illustrated in FIG. 13 is the processing performed at the timing of an execution request of the multiplexing processing by a user etc., and is performed asynchronously with the registration processing of the metadata described with reference to FIG. 12.

First, the control unit 2 obtains the multiplexing configuration information Cf from the storage unit 1 (Step S51). Thereafter, the control unit 2 in the same way obtains two or more video streams Vs to be joined based on information described in the obtained multiplexing configuration information Cf (Step S52). The control unit 2 further obtains also the metadata of the video stream Vs to be joined from the video stream metadata DB 8 (Step S53).

Next, the control unit 2 transmits the calculation request of the multiplexed stream header information to the multiplexed stream header information calculation unit 4 (Step S54). At this time, the control unit 2 transmits also the metadata of the video stream Vs to be joined, together with the calculation request of the multiplexed stream header information.

When receiving the calculation request of the multiplexed stream header information transmitted from the control unit 2, the multiplexed stream header information calculation unit 4 calculates the multiplexed stream header information (Step S55). The multiplexed stream header information calculation unit 4 calculates information of the code amount B of each joined picture Pcm which constitutes multiplexed stream S and the head position of each chunk Ck in the media data D of the multiplexed stream S as the multiplexed stream header information. Thereafter, the multiplexed stream header information calculation unit 4 transmits the created multiplexed stream header information to the control unit 2 (Step S56).

Next, the creation request of the multiplexed stream header is transmitted from the control unit 2 to the multiplexed stream header creation unit 5 (Step S57). The control unit 2 also transmits the multiplexed stream header information calculated by the multiplexed stream header information calculation unit 4, together with the creation request of the multiplexed stream header.

When receiving the creation request of the multiplexed stream header transmitted from the control unit 2, the multiplexed stream header creation unit 5 performs creation processing of the header H for the multiplexed stream S (Step S58). As for the creation processing of the multiplexed stream header, descriptions will be omitted here because it is the same processing as that described with reference to FIG. 10B.

When completing the creation processing of the multiplexed stream header, the multiplexed stream header creation unit 5 transmits the created header H for the multiplexed stream S to the control unit 2 (Step S59). Next, the output request of the multiplexed stream header is transmitted from the control unit 2 to the multiplexed stream output unit 7 (Step S60). At this time, the control unit 2 transmits also the header H for the multiplexed stream S created by the multiplexed stream header creation unit 5, together with the output request of the multiplexed stream header.

When receiving the output request of the multiplexed stream header transmitted from the control unit 2, the multiplexed stream output unit 7 outputs the header H for the multiplexed stream S (Step S61). The header H for the multiplexed stream S outputted from the multiplexed stream output unit 7 is transmitted to the receiving apparatus etc. When completing output of the header H for the multiplexed stream S, the multiplexed stream output unit 7 notifies the control unit 2 of the output completion of the multiplexed stream header (Step S62).

Next, the joining request of the video stream Vs is transmitted from the control unit 2 to the joined video stream generation unit 6 (Step S63). In the joining request of the video stream Vs, the video stream Vs, the position information of the video stream Vs and the configuration information of the joined video stream Ms (planned joint position etc. of each video stream Vs) are also included.

When receiving the joining request of the video stream Vs transmitted from the control unit 2, the joined video stream generation unit 6 generates the joined video stream Ms by joining pictures Pc of two or more video streams Vs (Step S64). Thereafter, the joined video stream generation unit 6 transmits the generated joined video stream Ms to the control unit 2 (Step S65).

Next, the output request of the multiplexed stream S is transmitted from the control unit 2 to the multiplexed stream output unit 7 (Step S66). When receiving the output request of the multiplexed stream, S transmitted from the control unit 2, the multiplexed stream output unit 7 performs the multiplexing processing of the joined video stream Ms and the audio stream As. Then, the joined video stream Ms and audio stream As on which the multiplexing processing have been performed are outputted as the multiplexed stream S (Step S67). When completing output of the multiplexed stream S, the multiplexed stream output unit 7 notifies the control unit 2 of the output completion of the multiplexed stream S (Step S68).

According to the above-mentioned second embodiment, the same effect as the effect obtained by the above mentioned first embodiment can be obtained. In addition, according to the above-mentioned second embodiment, it becomes unnecessary to analyze the video stream Vs to be joined each time the multiplexing processing is performed. Therefore, time for analyzing the video stream Vs in the second time or thereafter can be reduced.

[Third Embodiment]

Although an example where one data processing device 100 (100α) performs generation of the joined video stream Ms and the multiplexing processing has been given in each embodiment mentioned above, the present invention is not limited to this. For example, two or more servers may perform processing in a distributed manner.

Figure 14:
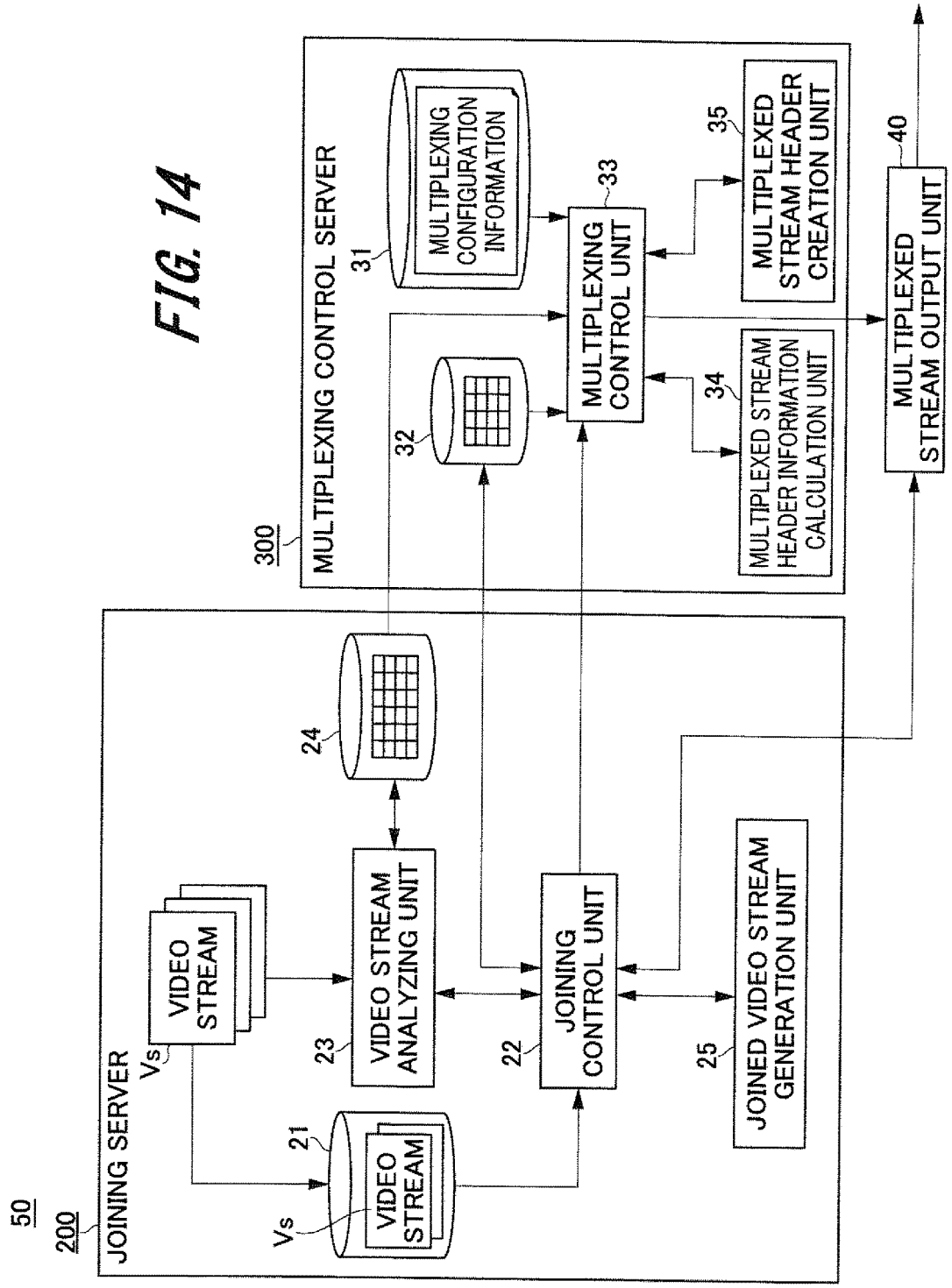
FIG. 14 is a block diagram illustrating a configuration example of a data processing system according to a third embodiment of the present invention.

FIG. 14 is a block diagram illustrating a configuration example of a data processing system 50 which includes a joining server 200 which performs generation of the joined video stream Ms, a multiplexing control server 300 which performs multiplexing processing, and a multiplexed stream output unit 40. The joining server 200 includes a video stream storage unit 21, a joining control unit 22, a video stream analyzing unit 23, a video stream metadata DB 24, and a joined video stream generation unit 25. Note that, FIG. 14 illustrates, for simplification of description, a configuration example of the data processing system 50 in which only video streams Vs are joined and multiplexed.

The video stream storage unit 21 is made up of an HDD, etc., and stores the video stream Vs inputted from the outside. The joining control unit 22 is made up of a CPU, etc., and controls each part which constitutes the joining server 200. In the same way as the video stream analyzing unit 3 in each embodiment mentioned above, the video stream analyzing unit 23 analyzes the video stream Vs to obtain a picture type of each picture which constitutes the video stream Vs, and at the same time, calculate a code amount b of each picture.

The video stream metadata DB 24, which is the same as the video stream metadata DB 8 illustrated in FIG. 11, has the analysis result of the video stream Vs registered as metadata of the video stream Vs. The joined video stream generation unit 25, which is the same as the joined video stream generation unit 6 in each embodiment mentioned above, generates the joined video stream Ms by joining two or more video streams Vs.

The multiplexing control server 300 includes a multiplexing configuration information storage unit 31, a video stream metadata access information DB 32, a multiplexing control unit 33, a multiplexed stream header information calculation unit 34, and a multiplexed stream header creation unit 35.

The multiplexing configuration information storage unit 31 is made up of an HDD, etc., and stores the multiplexing configuration information Cf. The video stream metadata access information DB 32 is a database where access information for the purpose of accessing the video stream metadata DE 24 is registered. As the access information, information such as an address of the video stream metadata DB 24, a table identifier given to each table which constitutes the video stream metadata DB 24, and an identifier of the video stream Vs is registered, for example.

The multiplexing control unit 33 is made up of a CPU, etc., and controls each part which constitutes the multiplexing control server 300. The multiplexed stream header information calculation unit 34, which is the same as the multiplexed stream header information calculation unit 4 in each embodiment mentioned above, calculates information necessary for creation of the header H for the multiplexed stream S. The multiplexed stream header creation unit 35, which is the same as the multiplexed stream header creation unit 5 in each embodiment mentioned above, creates the header H for the multiplexed stream S.

The multiplexed stream output unit 40, which is the same as the multiplexed stream output unit 7 in each embodiment mentioned above, outputs the headers for the multiplexed stream S or the multiplexed stream S.

Note that, although an example where only one joining server 200 exists has been given in an example illustrated in FIG. 14, the present invention is not limited to this. A configuration such that two or more joining servers 200 are provided, and each joined video stream Ms outputted from two or more joining servers 200 is multiplexed and outputted by the multiplexed stream output unit 40 may be adopted.

In addition, although an example where the multiplexed stream output unit 40 is provided outside the joining server 200 and the multiplexing control server 300 has been given in an example illustrated in FIG. 14, the present invention is not limited to this. The multiplexed stream output unit 40 may be provided inside the joining server 200 or inside the multiplexing control server 300.

In addition, although an example where the video stream storage unit 21 and the video stream metadata DB 24 are provided in the joining server 200, and the video stream metadata access information DB 32 is provided in the multiplexing control server 300 has been given in an example illustrated in FIG. 14, the present invention is not limited to this. Each of these databases may be provided in any server, and may be provided in other servers which are independent of the joining server 200 or the multiplexing control server 300.

Figure 15:
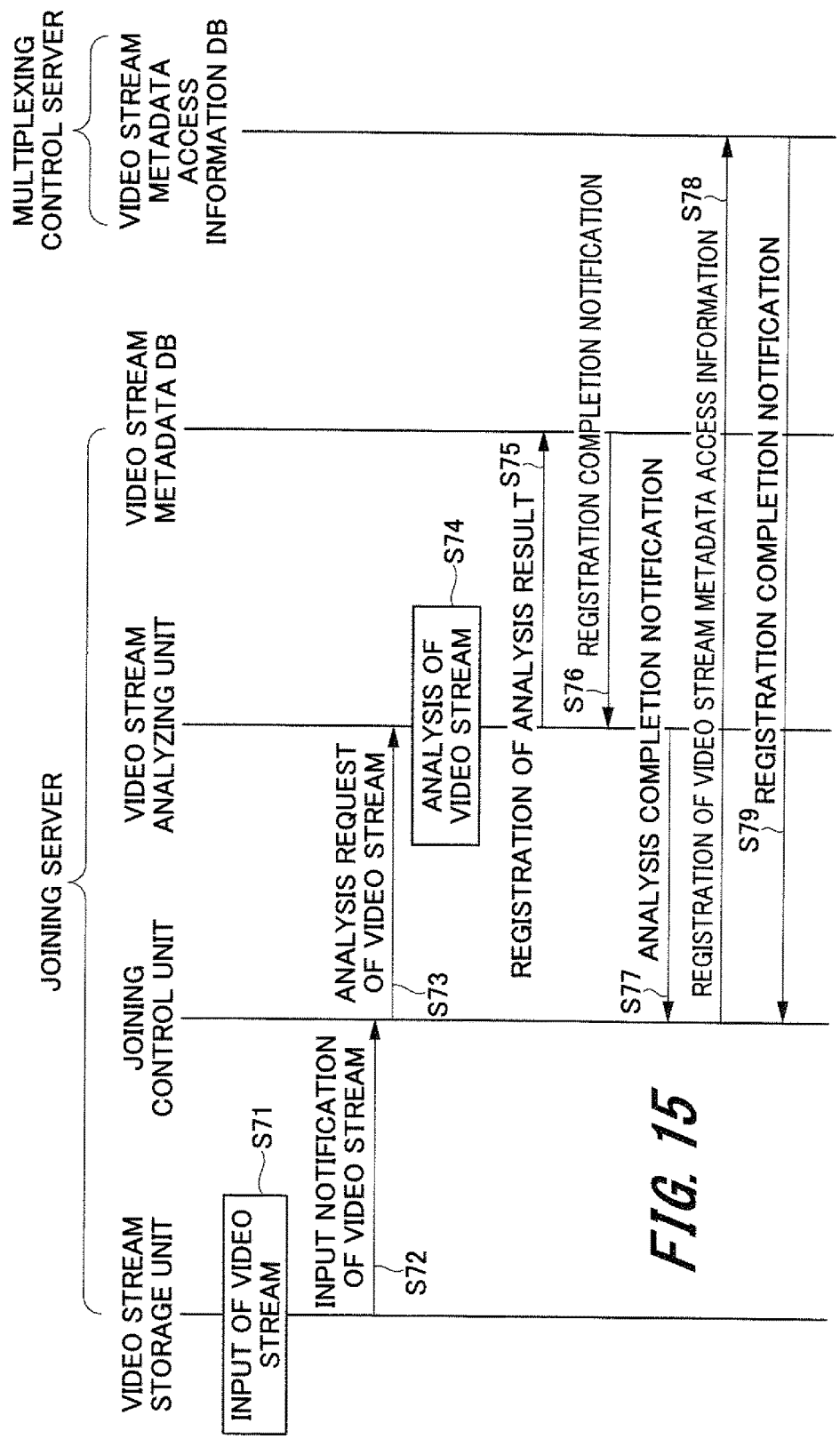
FIG. 15 is a flowchart illustrating an example of processing of the data processing system according to the third embodiment of the present invention.
Figure 16:
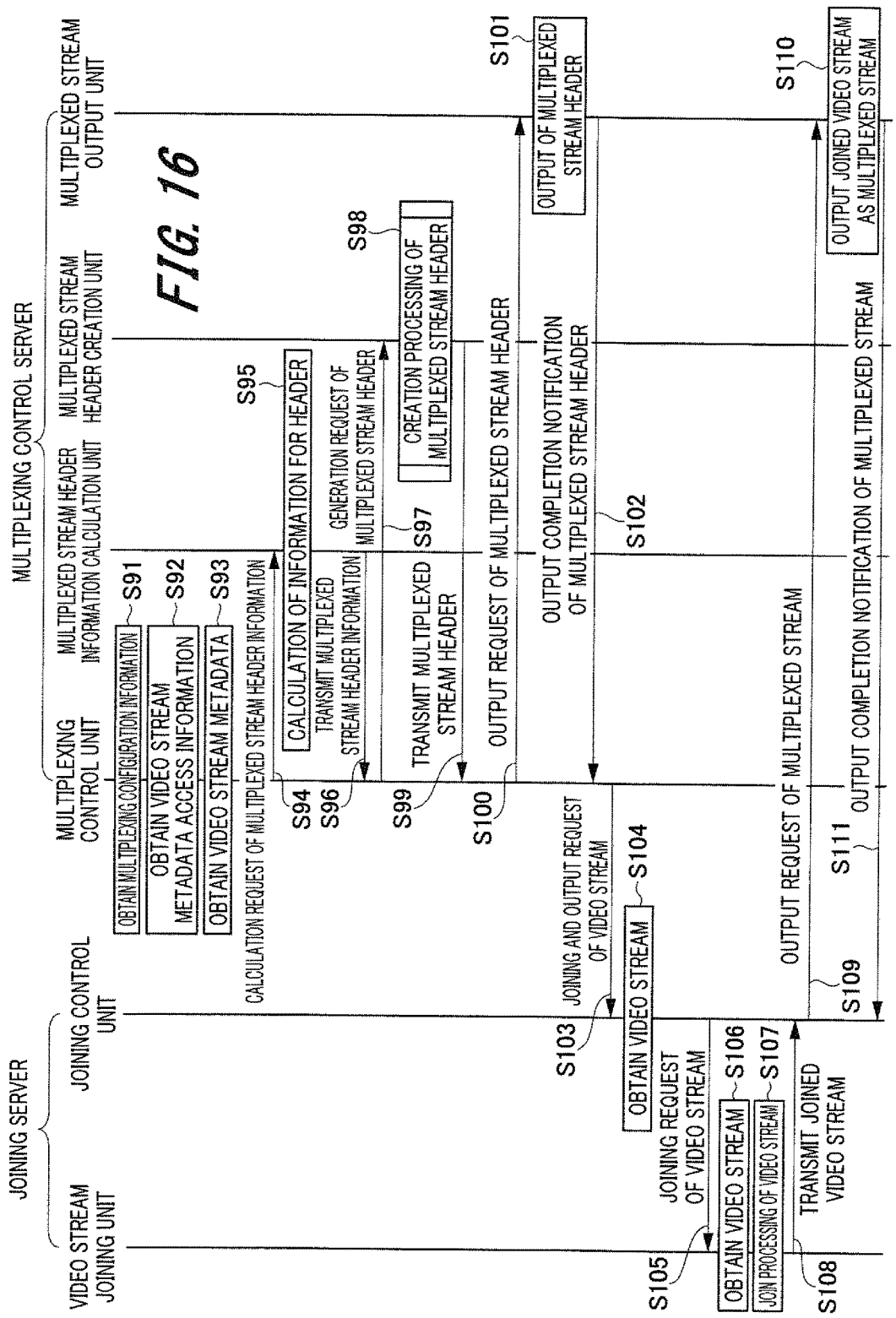
FIG. 16 is a flowchart illustrating an example of processing of the data processing system according to the third embodiment of the present invention.

Next, an example of processing of the data processing system 50 according to a third embodiment will be described with reference to flowcharts of FIGS. 15 and 16. FIG. 15 is a flowchart illustrating an example of processing by the joining server 200, and FIG. 16 is a flowchart illustrating an example of processing of the multiplexing control server 300, and generation processing of the joined video stream Ms by the joining server 200.

First, an example of processing by the joining server 200 will be described with reference to FIG. 15. First, when the video stream Vs is transmitted from the picture signal encoding unit 11 etc. illustrated in FIGS. 1 or 11, and is inputted in the video stream storage unit 21 (Step S71), the input notification of the video stream Vs is sent from the video stream storage unit 21 to the joining control unit 22 (Step S72). At this time, the video stream storage unit 21 transmits also position information of the video stream Vs which is newly inputted, together with the input notification of the video stream Vs. The position information of the video stream Vs means the path to the storage place of the video stream Vs, the identifier of the video stream Vs or the like, for example.

Next, the analysis request of the video stream Vs is transmitted from the joining control unit 22 to the video stream analyzing unit 23 (Step S73). The joining control unit 22 requests the video stream analyzing unit 23 to calculate the picture type of each picture Pc which constitutes the video stream Vs and the code amount b of each picture Pc as the analysis request of the video stream Vs. At this time, the joining control unit 22 transmits also the identifier of the video stream Vs and position information of the video stream Vs together.

When receiving the analysis request of the video stream Vs transmitted from the joining control unit 22, the video stream analyzing unit 23 analyzes the video stream Vs (Step S74). The video stream analyzing unit 23 obtains the picture type of each picture which constitutes the video stream Vs, and the code amount b of the each picture, by analyzing the video stream Vs.

Subsequently, the video stream analyzing unit 23 registers the analysis result of the video stream Vs in the video stream metadata DB 24 as the metadata of the video stream Vs (Step S75). When completing the registration of the video stream Vs in the database, the video stream metadata DB 24 notifies the video stream analyzing unit 23 of the registration completion (Step S76). When receiving the registration completion notification transmitted from the video stream metadata DB 24, the video stream analyzing unit 23 notifies the joining control unit 22 of the completion of analysis of the video stream Vs (Step S77).

When receiving the analysis completion notification of the video stream Vs transmitted from the video stream analyzing unit 23, the joining control unit 22 registers access information for the purpose of accessing the video stream metadata DB 24 in the video stream metadata access information DB 32 in the multiplexing control server 300 (Step S78).

When completing registration of the access information to the database, the video stream metadata access information DB 32 notifies the joining control unit 22 of the registration completion of the access information of the video stream metadata (Step S79).

The Processing from Step S71 to Step S79 in FIG. 15 described above is performed for all of the newly inputted video streams Vs each time the new video stream Vs is inputted to the video stream storage unit 21.

FIG. 16 is a flowchart illustrating an example of header creation processing and multiplexing processing by the data processing system 50. Processing illustrated in FIG. 16 is processing performed at the timing when an execution request of the multiplexing processing is carried out by a user etc., and is performed asynchronously with the registration processing of the metadata of the video stream Vs described with reference to FIG. 15.

First, the multiplexing control unit 33 of the multiplexing control server 300 obtains the multiplexing configuration information Cf from the multiplexing configuration information storage unit 31 (Step S91). Thereafter, the multiplexing control unit 33 in the same way obtains the access information to the metadata of two or more video streams Vs to be joined in the multiplexing configuration information Cf from the video stream metadata access information DB 32 (Step S92). The multiplexing control unit 33 further obtains the metadata of the video stream Vs to be joined from the video stream metadata DB 24 based on the obtained access information (Step S93).

Next, the multiplexing control unit 33 transmits the calculation request of the multiplexed stream header information to the multiplexed stream header information calculation unit 34 (Step S94). The multiplexing control unit 33 transmits also the metadata of the video stream Vs to be joined, together with the calculation request of the multiplexed stream header information.

When receiving the calculation request of the multiplexed stream header information transmitted from the multiplexing control unit 33, the multiplexed stream header information calculation unit 34 calculates the multiplexed stream header information (Step S95). The multiplexed stream header information calculation unit 34 calculates information of the code amount B of each joined picture Pcm which constitutes multiplexed stream S and the head position of each chunk Ck in the media data D of the multiplexed stream S as the multiplexed stream header information. Thereafter, the multiplexed stream header information calculation unit 34 transmits the created multiplexed stream header information to the multiplexing control unit 33 (Step S96).

Next, the creation request of the multiplexed stream header is transmitted from the multiplexing control unit 33 to the multiplexed stream header creation unit 35 (Step S97). The multiplexing control unit 33 transmits also the multiplexed stream header information calculated by the multiplexed stream header information calculation unit 34, together with the creation request of the multiplexed stream header, When receiving the creation request of the multiplexed stream header transmitted from the multiplexing control unit 33, the multiplexed stream header creation unit 35 performs creation processing of the header H for the multiplexed stream S (Step S98). As for the creation processing of the multiplexed stream header, descriptions will be omitted here because the processing is the same as that described with reference to FIG. 10B.

When completing the creation processing of the multiplexed stream header, the multiplexed stream header creation unit 35 transmits the created header H for the multiplexed stream S to the multiplexing control unit 33 (Step S99). Next, the output request of the multiplexed stream header is transmitted from the multiplexing control unit 33 to the multiplexed stream output unit 40 (Step S100). At this time, the multiplexing control unit 33 transmits also the header H for the multiplexed stream S created by the multiplexed stream header creation unit 35, together with the output request of the multiplexed stream header.

When receiving the output request of the multiplexed stream header transmitted from the multiplexing control unit 33, the multiplexed stream output unit 40 outputs the header H for the multiplexed stream S (Step S101). The header H for the multiplexed stream S outputted from the multiplexed stream output unit 40 is transmitted to the receiving apparatus etc. When completing output of the header H for the multiplexed stream S, the multiplexed stream output unit 40 notifies the multiplexing control unit 33 of the output completion of the multiplexed stream header (Step S102).

Next, the joining and output request of the video stream Vs is transmitted from the multiplexing control unit 33 to the joining control unit 22 in the joining server 200 (Step S103). The joining and output request of the video stream Vs also includes the video stream Vs, the position information of the video stream Vs and the configuration information of the joined video stream Ms (planned joint position etc. of each video stream Vs).

When receiving the joining request of the video stream Vs transmitted from the multiplexing control unit 33, the joining control unit 22 obtains the video stream Vs to be joined from the video stream storage unit 21, based on the position information of the video stream Vs (Step S104). Subsequently, the joining control unit 22 transmits the joining request of the video stream to the joined video stream generation unit 25 (Step S105). At this time, the joining control unit 22 transmits also the position information of the video stream Vs and the configuration information of the joined video stream Ms (planned joint position etc. of each video stream Vs) to the joined video stream generation unit 25.

When receiving the joining request of the video stream transmitted from the joining control unit 22, the joined video stream generation unit 25 obtains two or more video streams Vs from the video stream storage unit 21 (Step S106). Subsequently, the joined video stream generation unit 25 generates the joined video stream Ms by joining two or more video streams Vs in the unit of the picture Pc (Step S107). Thereafter, the joined video stream generation unit 25 transmits the generated joined video stream Ms to the joining control unit 22 (Step S108).

Next, the output request of the multiplied stream S is transmitted from the joining control unit 22 to the multiplexed stream output unit 40 (Step S109). When receiving the output request of the multiplexed stream S transmitted from the joining control unit 22, the multiplexed stream output unit 40 performs multiplexing processing of the joined video stream Ms. Then, the joined video stream Ms in which the multiplexing processing have been performed is outputted as the multiplexed stream S (Step S110). When completing output of the multiplexed stream S, the multiplexed stream output unit 40 notifies the joining control unit 22 of the output completion of the multiplexed stream S (Step S111).

According to the above mentioned third embodiment, the same effect as that obtained by the first embodiment mentioned above can be obtained. In addition, according to the third embodiment mentioned above, shortening of processing time can be achieved because processes can be distributed into two or more servers.

Note that, two or more joining servers 200 may be provided in the data processing system 50 as mentioned above. For example, it is assumed that the joined video stream Ms is constituted by 2 pictures in the longitudinal direction ×2pictures in the lateral direction=4 pictures. In addition, it is assumed that among 4 pictures Pcm which constitute the joined video stream Ms, the joined video streams Ms arranged in the upper half region are generated by a joining server 200A, and the joined video streams Ms arranged in the lower half region are generated by a joining server 200B.

In such a case, the configuration information (planned joint position etc. of each video stream Vs) of the joined video stream Ms is also transmitted when the output request of the multiplexed stream header is transmitted from the multiplexing control unit 33 to the multiplexed stream output unit 40, in the above-mentioned Step S100. That is, transmitted is information indicating that among 4 joined video streams Ms, the joined video streams Ms arranged in the upper half region is outputted from the joining server 200A, and the joined video streams Ms arranged in the lower half region is outputted from the joining server 200B.

The same information is written also in the configuration information of the joined video stream Ms which is transmitted when the joining and output request of the video stream Vs is transmitted from the joining control unit 22 to the joining control unit 22 in the joining server 200A (joining server 200B) in Step S103.

It becomes possible to perform the join processing and multiplexing processing of the video stream Vs also in an embodiment in which two or more joining servers 200 exist by performing such processing. In addition, the generation processing of the joined video stream Ms comes to be performed in parallel among two or more joining servers 200 by providing two or more joining servers 200. That is, it becomes possible to shorten the whole processing time.

In addition, not only the joining server 200 but also the multiplexed stream output unit 40 may be provided in plurality. In this case, the joining and output request of the video stream Vs transmitted from the joining control unit 22 to the joining control unit 22 in the joining server 200A (joining server 200B) may be transmitted while including also an identifier of the multiplexed stream output unit 40 therein.

In addition, each of the joining server 200 and multiplexing control server 300 in the third embodiment mentioned above is not limited to one which is constituted as a server apparatus. For example, the server may be applied to a digital still camera or video camera which is provided with an imaging unit, or a data image processor etc. which is used in an image processing service where a photographed image Po, which is transmitted via a network, is processed and developed, or processed into a photograph book etc.

In addition, although an configuration has been given as an example in the third embodiment mentioned above where the joining server 200 includes the joining control unit 22, the video stream analyzing unit 23 and the joined video stream generation unit 25, and the multiplexing control server 300 includes the multiplexing control unit 33, the multiplexed stream header information calculation unit 34, and the multiplexed stream header creation unit 35, the present invention is not limited to this. Each of these units may be provided in any server, and each of these units may be provided as each independent apparatus (a video stream analysis apparatus (data size calculation apparatus), a joined video stream generating apparatus, a multiplexed stream header information calculation apparatus, a multiplexed stream header creation apparatus (header creation apparatus), a multiplexed stream output apparatus).

Although examples where the video streams Vs which are encoded in a standard format such as MPEG-4 are joined and multiplexed have been given in the various embodiments mentioned above, the present invention is not limited to this. Processing to change in advance a configuration of the video stream Vs encoded in a standard format or the like may be performed for the purpose of further increasing the speed of creation processing of the header H for the multiplexed stream S. For example, if information necessary for creation of the header H (code amount b etc. of each picture) is arranged in advance at the head of a file, only processing to read information of the position may be needed at the time of creating the header H. That is, since the video stream analyzing unit 3 will have no need to perform processing to analyze the whole file, the speed of creation, processing of the header K can be further increased. Note that, information necessary for creation of the header H, while not being written inside the video stream Vs, may be written in other files different from the video stream Vs or may be controlled in a database.

In addition, the various embodiments mentioned above have a configuration where the joined video stream obtained by joining at least two or more video streams Vs is outputted as the multiplexed stream as mentioned above. Therefore, for example, only the joined video stream may be multiplexed with the header information to be output as the multiplexed stream. In addition, although an example where one screen is divided into nine small screens is illustrated in (2-1) of FIG. 2, the other division numbers maybe applicable. In addition, without dividing one screen equally, a size of a small screen corresponding to a certain video stream may be larger or smaller than sizes of small screens corresponding to other video streams, for example.

In addition, a series of processing in examples of embodiments mentioned above can also be executed by software. When a series of processing is executed by software, the execution is possible by a computer in which a program constituting the software is incorporated in dedicated hardware, or a computer in which a program for executing various functions is installed. For example, a program constituting desired software may be installed and executed in a general-purpose personal computer or the like. In addition, the series of processing may be applicable to software placed on a server connected to a network or under a cloud computing environment.

In addition, a recording medium which stores a program code of software to realize functions of examples of embodiments mentioned above may be supplied to a system or an apparatus. In addition, it is needless to say that functions are realized also by a computer (or a control device such as a CPU) of a system or an apparatus reading and executing a program code stored in the recording medium.

REFERENCE SIGNS LIST

1—Storage unit, 2—Control unit, 3—Video stream analyzing unit, 4—Multiplexed stream header information calculation unit, 5—Multiplexed stream header creation unit, 6—Joined video stream generation unit, 7—Multiplexed stream output unit, 8—Video stream metadata DB, 21—Video stream storage unit, 22—Joining control unit, 23—Video stream analyzing unit, 24—Video stream metadata DB, 25—Joined video stream generation unit, 31—Multiplexing configuration information storage unit, 32—Video stream metadata access information DB, 33—Multiplexing control unit, 34—Multiplexed stream header information calculation unit, 35—Multiplexed stream header creation unit, 40—Multiplexed stream output unit, 50—Data processing system, 100—Data processing device, 200—Joining server, 300—Multiplexing control server

The invention claimed is:

1. A data processing device, comprising:
a processor programmed to:
calculate data sizes of respective joined frames constituting a joined video stream to be generated by joining respective corresponding frames of a plurality of video streams to provide the respective joined frames of the joined video stream, based upon code amounts of encoded picture signals of the respective corresponding frames of the plurality of video streams, prior to generation of the joined video stream;
create a header of a multiplexed stream including the joined video stream to be generated, based on the calculated data sizes of the respective joined frames of the joined video stream;

generate the joined video stream by joining the respective corresponding frames of the plurality of video streams to provide the respective joined frames of the joined video stream, after the header of the multiplexed stream has been created; and perform output processing of the header of the multiplexed stream and generation and output processing of the multiplexed stream including the generated joined video stream.

2. The data processing device according to claim 1, wherein
the processor performs the generation and output processing of the multiplex stream based on a file format in which the header of the multiplexed stream is arranged before a media data part of the multiplexed stream, the media data part being constituted of the joined video stream.

3. The data processing device according to claim 2, wherein
the processor calculates a size of the header of the multiplexed stream, based upon a structure body of the header of the multiplexed stream, created based on the information of the data sizes of the respective joined frames of the generated joined video stream.

4. The data processing device according to claim 3, wherein
the processor generates the multiplexed stream including the joined video stream, with a plurality of joined frames of the respective joined frames of the joined video stream, being set as one data unit constituting the multiplexed stream;

the processor calculates a first position of each data unit of the multiplexed stream, indicating a head position of the data unit, in the media data part of the multiplexed stream, based on the information of the data sizes of the respective joined frames of the generated joined video stream; and the processor fixes the size of the header by writing information of the calculated first position of each data unit of the multiplexed stream, in a prescribed constituent element in the structured body of the header of the multiplexed stream; and the processor rewrites the first position of each data unit of the multiplexed stream, written in the prescribed constituent element in the structure body of the header, into a second position indicating a head position of each data unit, in the whole multiplexed stream including the header.

5. The data processing device according to claim 4, wherein
the processor performs output processing of the header of the multiplexed stream before outputting the multiplexed stream.

6. The data processing device according to claim 4, wherein
the processor applies an MP4 file format when performing the generation and output processing of the multiplexed stream, and the prescribed constituent element in the structure body of the header of the multiplexed stream is a stco box.

7. The data processing device according to claim 4, further comprising:
a memory storing a video stream metadata database including code amounts of the encoded picture signals of the respective corresponding frames of the plurality of video streams as metadata of the plurality of video streams, wherein the processor performs generation processing of the joined video stream and generation and output processing of the multiplexed stream, respectively, based on information of the metadata of the plurality of video streams, included in the video stream metadata database.

8. The data processing device according to claim 1, wherein
the code amounts of the encoded picture signals of the respective corresponding frames of the plurality of video streams, based on which the data sizes of the respective joined frames constituting the joined video stream are calculated, include additional code amounts of the encoded picture signals of the respective corresponding frames of the plurality of video streams, which are increased when the respective corresponding frames of the plurality of video streams are joined to generate the respective joined frames of the joined video stream.

9. The data processing device according to claim 1, wherein the respective corresponding frames of the plurality of video streams, joined to generate the respective joined frames of the joined video stream included in the multiplexed stream, are simultaneously displayed in corresponding divided regions of a display screen.

10. A data processing method, comprising:
calculating data sizes of respective joined frames constituting a joined video stream to be generated by joining respective corresponding frames of a plurality of video streams to generate the respective joined fames of the joined video stream, based upon code amounts of encoded picture signals of the respective corresponding frames of the plurality of video streams, prior to generation of the joined video stream;

generating a header of a multiplexed stream including the joined video stream to be generated, based on the calculated data sizes of the respective joined frames of the joined video stream;

generating the joined video stream by joining the respective corresponding frames of the plurality of video streams to provide the respective joined frames of the joined video stream, after the header of the multiplexed stream has been created; and performing output processing of the header of the multiplexed stream and generating and outputting processing of the multiplexed stream including the generated joined video stream.

11. A non-transitory computer readable recording medium storing a program causing a computer to execute steps comprising:
calculating data sizes of respective joined frames constituting a joined video stream to be generated by joining respective corresponding frames of a plurality of video streams to generate the respective joined fames of the joined video stream, based upon code amounts of encoded picture signals of the respective corresponding frames of the plurality of video streams, prior to generation of the joined video stream;

generating a header of a multiplexed stream including the joined video stream to be generated, based on the calculated data sizes of the respective joined frames of the joined video stream;

generating the joined video stream by joining the respective corresponding frames of the plurality of video streams to provide the respective joined frames of the joined video stream, after the header of the multiplexed stream has been created; and performing output processing of the header of the multiplexed stream and generating and outputting processing of the multiplexed stream including the generated joined video stream.

12. A data processing system, comprising:
a processor programmed to:
calculate data sizes of respective joined frames constituting a joined video stream to be generated by joining respective corresponding frames of a plurality of video streams to provide the respective joined frames of the joined video stream, based upon code amounts of encoded picture signals of the respective corresponding frames of the plurality of video streams, prior to generation of the joined video stream;
create a header of a multiplexed stream including the joined video stream to be generated, based on the calculated data sizes of the respective joined frames of the joined video stream;
generate the joined video stream by joining the respective corresponding frames of the plurality of video streams to provide the respective joined frames of the joined video stream, after the header of the multiplexed stream has been created; and
perform output processing of the header of the multiplexed stream and generation and output processing of the multiplexed stream including the generated joined video stream.

* * * * *